May 21, 1957 P. AUTIO 2,792,578
NUT AND WASHER ASSEMBLY APPARATUS
Filed Nov. 6, 1952 9 Sheets-Sheet 1

INVENTOR.
Paul Autio
BY
Moore, Olson & Trexler
Attys.

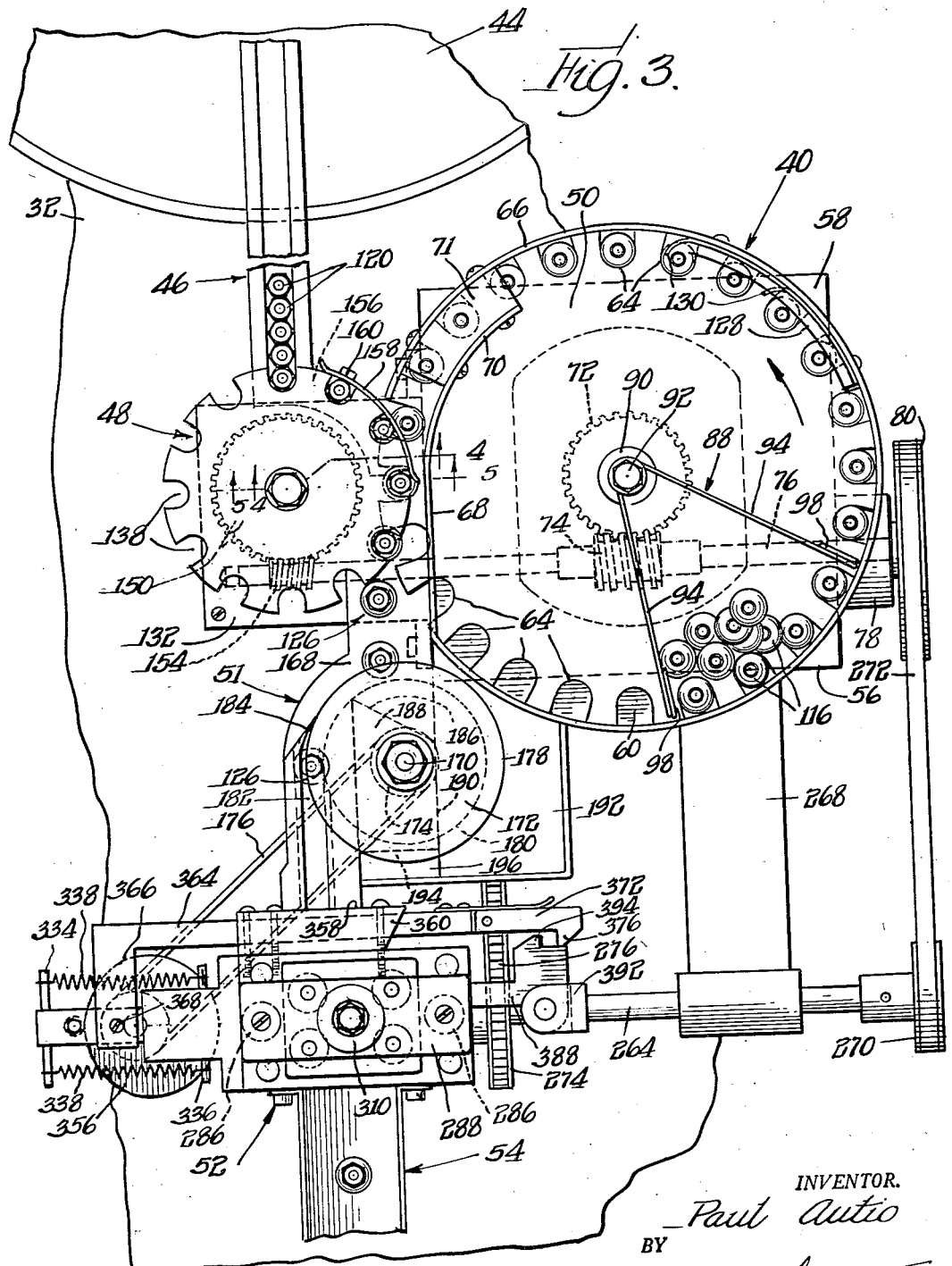

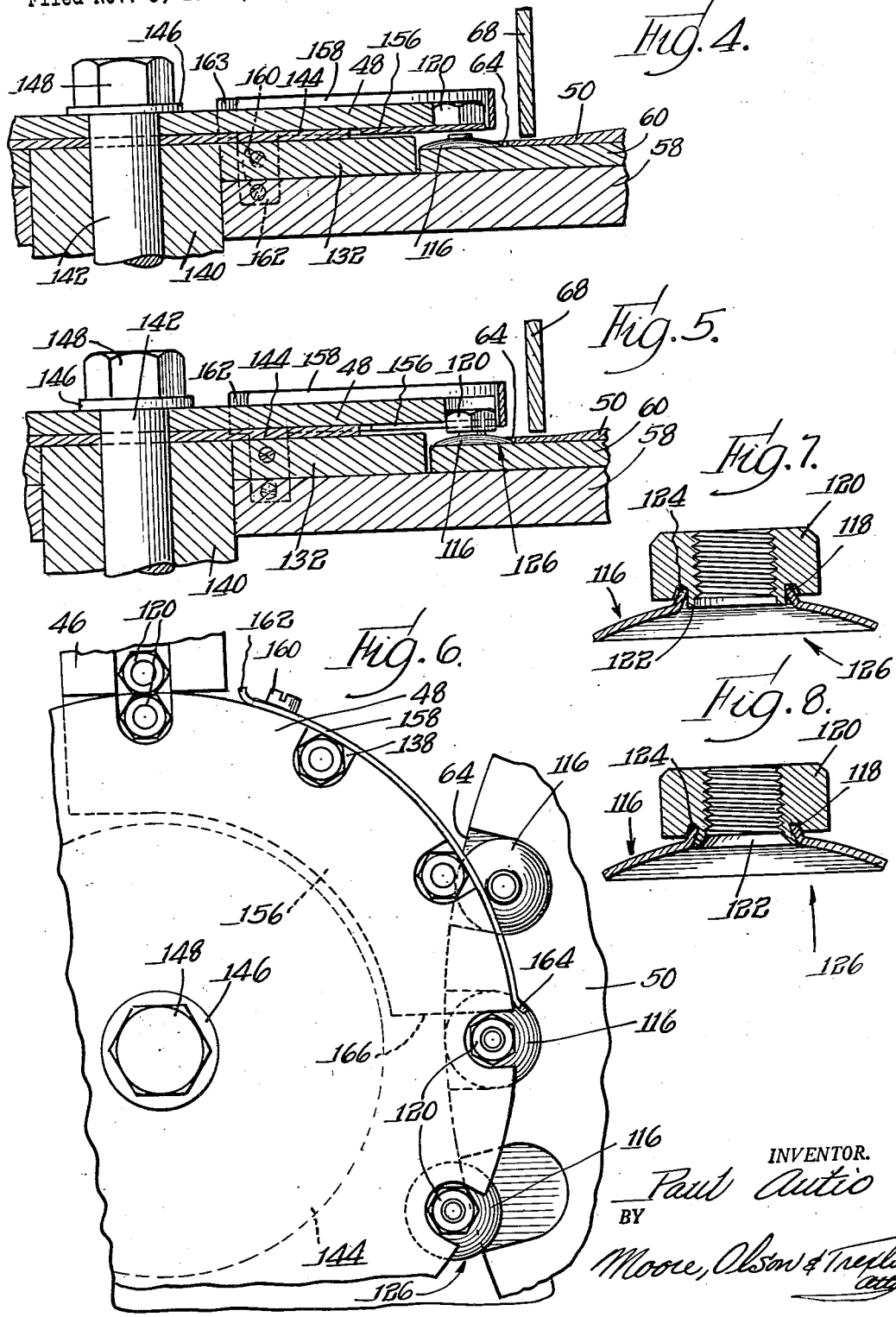

May 21, 1957 P. AUTIO 2,792,578
NUT AND WASHER ASSEMBLY APPARATUS
Filed Nov. 6, 1952 9 Sheets-Sheet 4
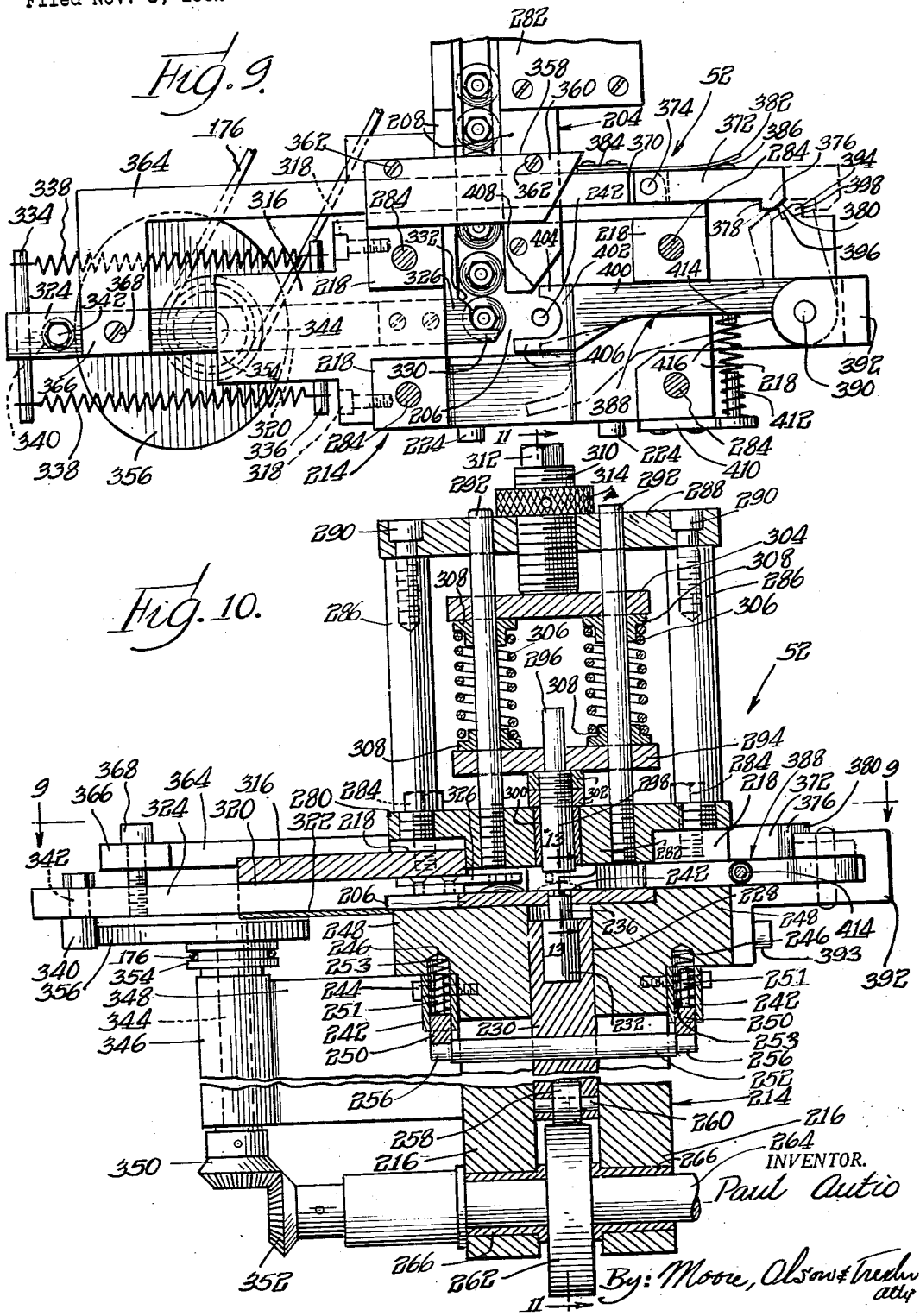
INVENTOR.
Paul Autio
By: Moore, Olson & Trexler
atty

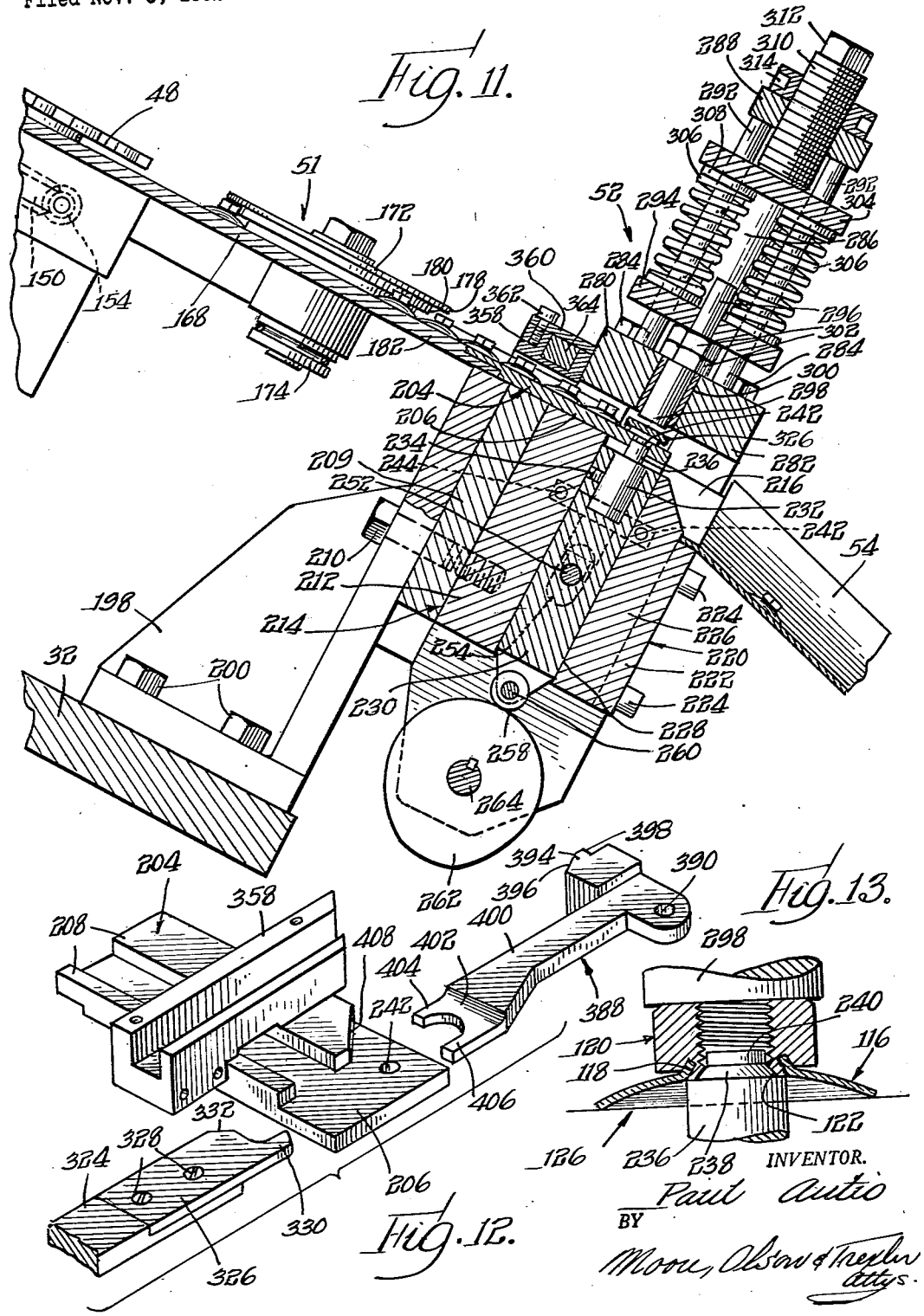

INVENTOR.
Paul Autio

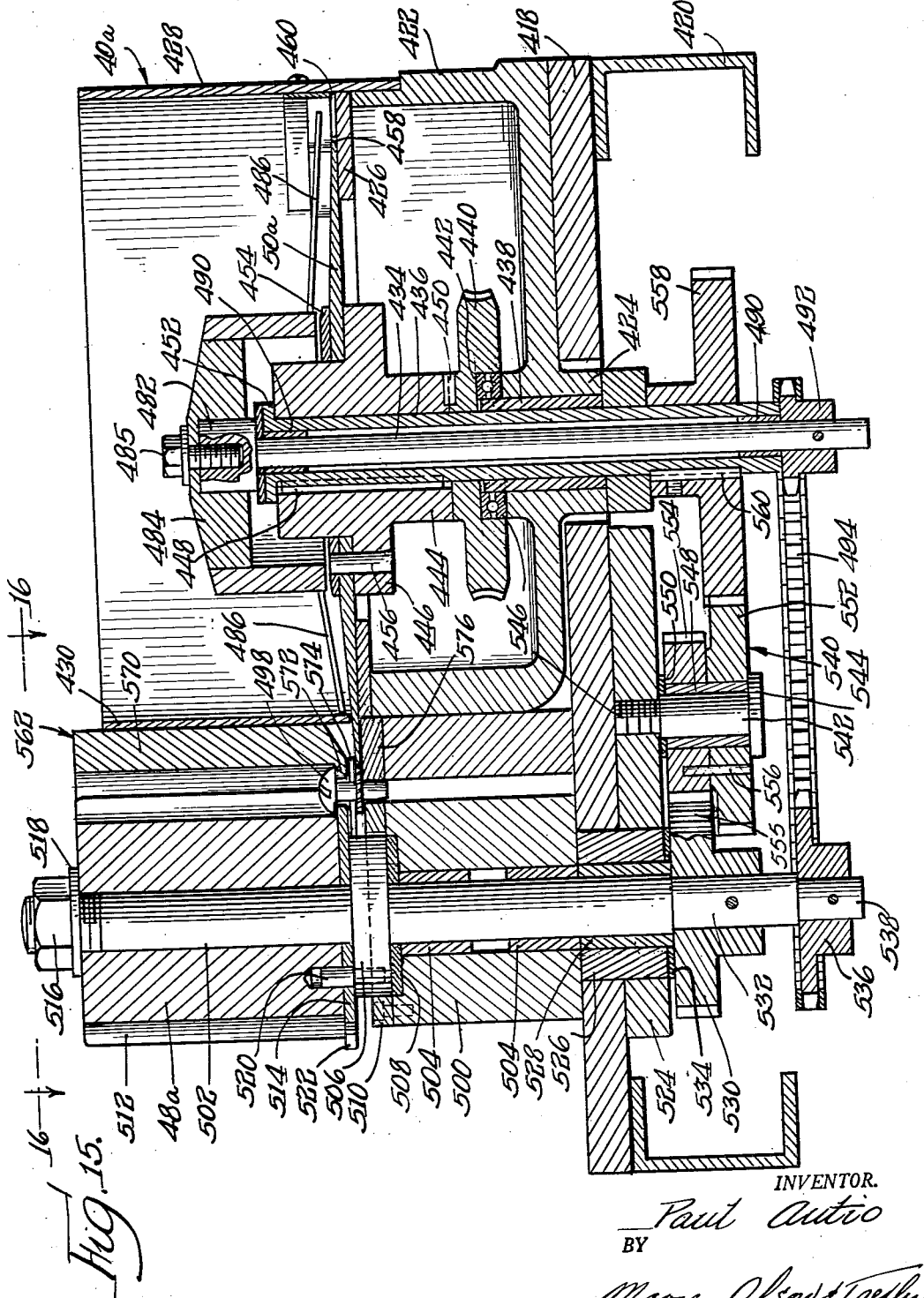

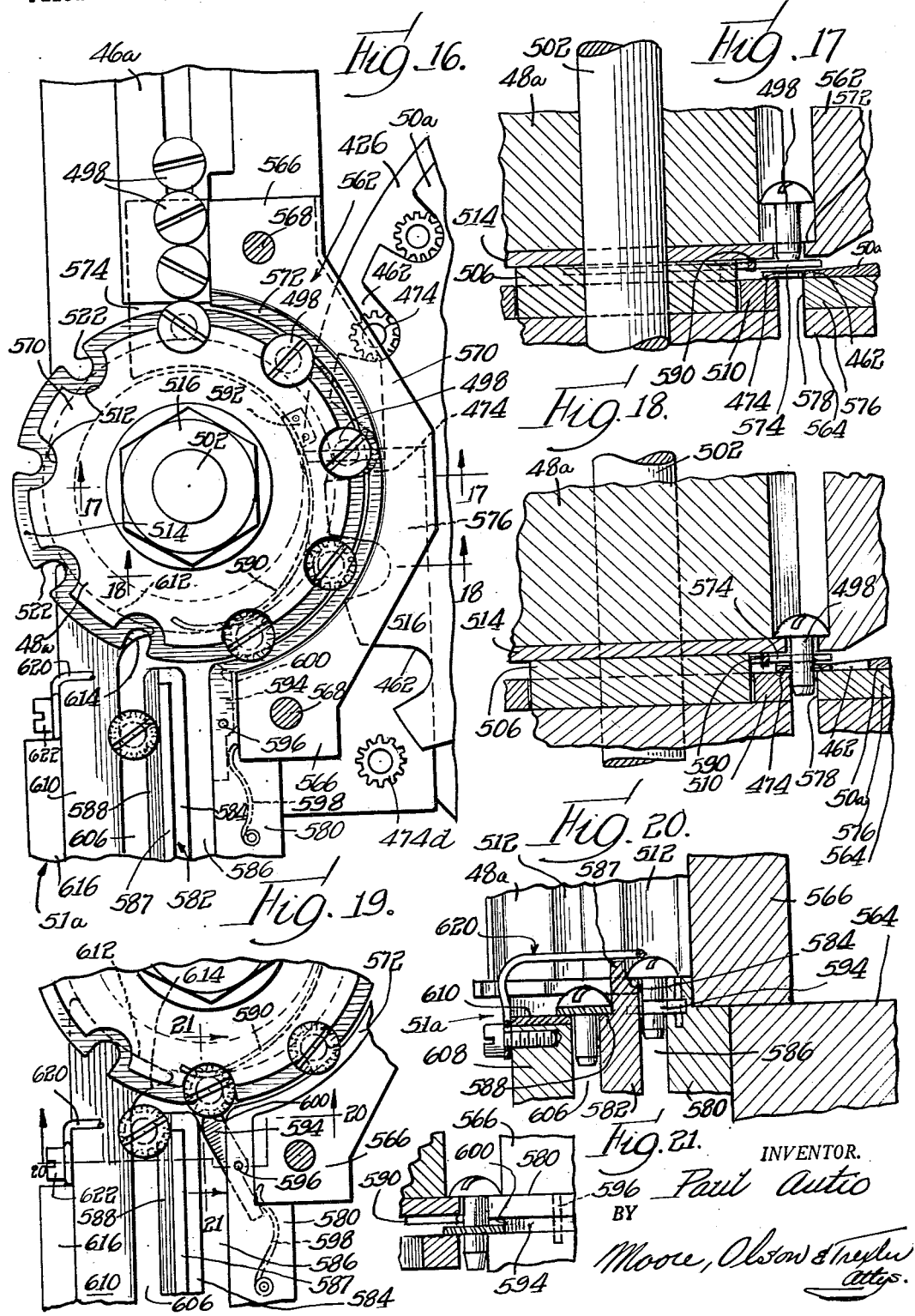

May 21, 1957 P. AUTIO 2,792,578
NUT AND WASHER ASSEMBLY APPARATUS
Filed Nov. 6, 1952 9 Sheets-Sheet 9
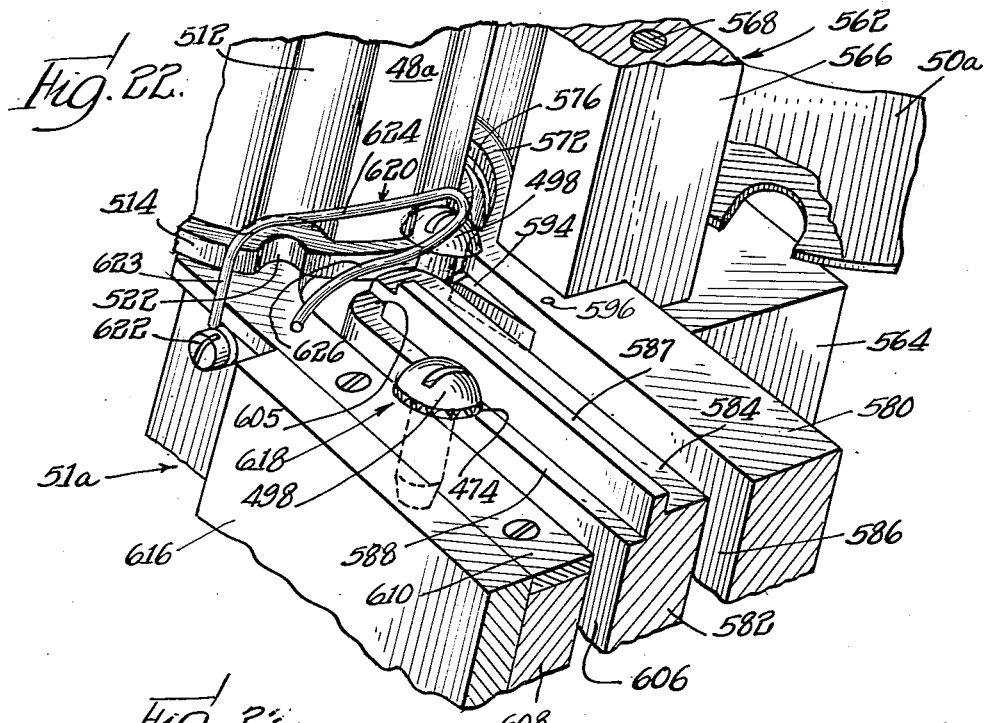
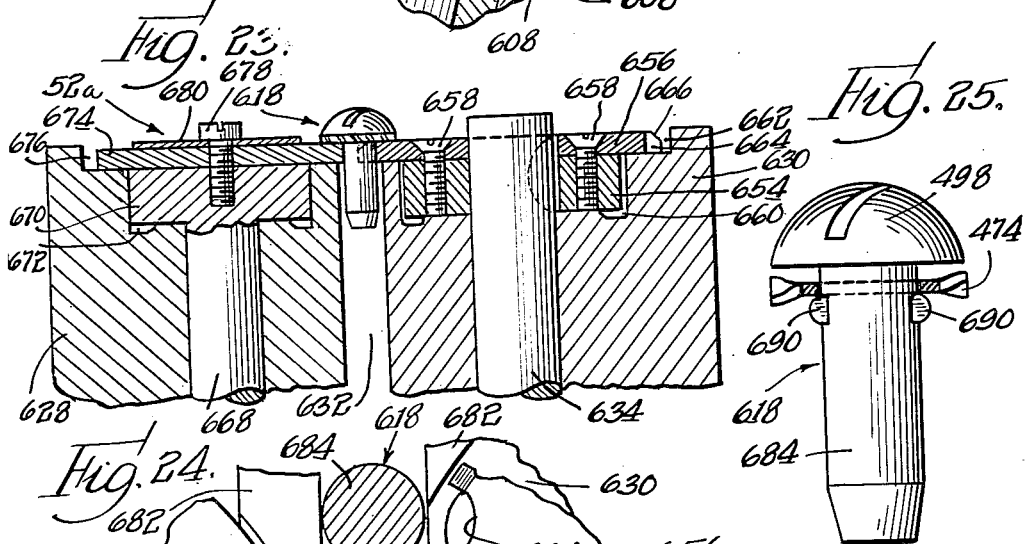
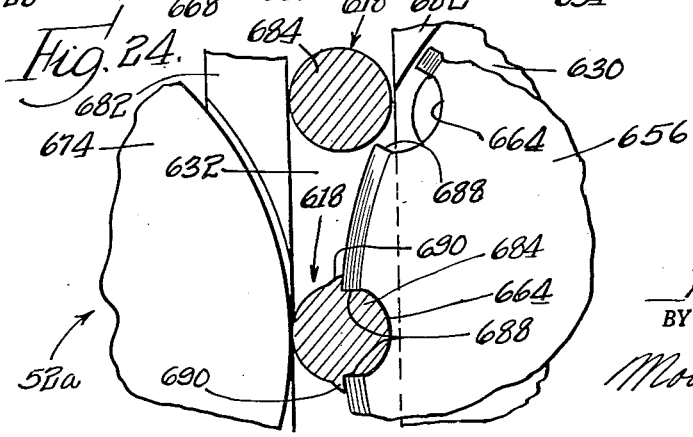
INVENTOR.
Paul Autio
BY
Moore, Olson & Trexler
attys.

United States Patent Office 2,792,578
Patented May 21, 1957

2,792,578

NUT AND WASHER ASSEMBLY APPARATUS

Paul Autio, Chicago, Ill., assignor to Illinois Tool Works, Chicago, Ill., a corporation of Illinois Application November 6, 1952, Serial No. 319,160

36 Claims. (Cl. 10—155)

This invention is concerned with a machine for assembling washers with threaded or rotary fasteners such as screws or nuts.

Heretofore the speed of assembly of rotary fasteners with loose, individual or discrete washers has been limited. It generally has been found necessary to employ an intermittent washer feed so that the fasteners may be brought into axial alignment with the washers while the washers are temporarily stationary, or to advance the washers at a slow rate while the fasteners are fed substantially transversely of the washer path into alignment with the washers for telescoping therewith.

It is accordingly an object of this invention to provide apparatus for assembling rotary fasteners with loose, individual or discrete washers while the washers and fasteners are continuously moved at a constant uniform rate of speed higher than heretofore thought possible.

Another object of this invention is to provide an apparatus for telescopically associating rotary fasteners and loose washers while the fasteners and washers are fed in substantially the same direction at substantially the same rate of speed.

Another object of this invention is to provide apparatus for feeding rotary fasteners and loose washers into axial alignment along overlapping, reversely curved paths.

A further object of this invention is to provide apparatus for feeding rotary fasteners and loose washers over relatively converging paths and for removing vertical support from the fasteners while the fasteners and washers are moving substantially at the same speed in substantially the same direction and in axial alignment to bring the fasteners into telescopic association with the washers.

Yet another object of this invention is to feed rotary fasteners and loose washers into telescopic engagement by means of overlapping rotary carriers rotating in timed relation about parallel axes.

In one embodiment of my invention, a further object of my invention resides in providing a screw carrier adapted to carry screws of diverse lengths into telescopic association with loose washers without modifying the screw carrier in accordance with the lengths of the screws.

Due to various factors such as imperfect fasteners or washers, or absence of a fastener or washer, imperfect assemblies or loose fasteners and washers occasionally will be discharged from assembling mechanisms. It is obviously undesirable for loose washers or fastening elements or imperfect assemblies to be mixed in with perfect assemblies.

An object of this invention is to provide a new or improved machine for assembling rotary fasteners and washers and for selecting perfect assemblies.

Another object of this invention is to provide one embodiment of a machine as set forth in the last foregoing object wherein the selecting mechanism is incorporated in part of the assembling mechanism.

A further object of this invention is to provide, in one embodiment, a machine for assembling rotary fasteners and washers and selecting perfect assemblies wherein means is provided for feeding perfect assemblies, loose fasteners, and loose washers away from the assembling mechanism over different paths.

A more limited object of this invention is to provide improved mechanism for segregating perfect assemblies of screws and washers and loose screws and loose washers.

A still further object of this invention is to provide a new or improved machine for assembling rotary fastener elements with washer elements, selecting perfect assemblies, and deforming one element of each assembly for permanently trapping the assembled elements together.

Other and further objects and advantages of the present invention will be apparent from the ensuing description when taken in connection with the drawings wherein:

Fig. 3 is a top view of the machine;

Fig. 4 is a vertical sectional view along the line 4—4 of Fig. 3;

Fig. 5 is a vertical sectional view somewhat similar to Fig. 4 and taken along the line 5—5 of Fig. 3;

Fig. 6 is an enlarged plan view of the assembling mechanism as taken from the top of Figs. 4 and 5;

Fig. 7 is a sectional view of a telescoped assembly comprising a nut element and dished or concave-convex washer;

Fig. 8 is a view similar to Fig. 7 after the nut has been swaged permanently to trap the washer thereon;

Fig. 9 is a horizontal sectional view of the nut element swaging or staking unit taken substantially along the line 9—9 of Fig. 10;

Fig. 10 is a cross-sectional view of the staking unit as taken along the line 10—10 of Fig. 1;

Fig. 11 is a vertical sectional view of the staking unit taken along the line 11—11 of Fig. 10;

Fig. 12 is a perspective view of certain parts of the staking unit;

Fig. 13 is an enlarged cross-sectional view showing an assembly being staked and taken substantially along the line 13—13 of Fig. 10;

Fig. 15 is a substantially vertical sectional view taken along the line 15—15 of Fig. 14;

Fig. 16 is a fragmentary top view of a portion of the assembly mechanism and is taken substantially along the line 16—16 of Fig. 15;

Fig. 17 is a fragmentary vertical sectional view taken substantially along the line 17—17 of Fig. 16;

Fig. 18 is a sectional view generally similar to Fig. 17 and taken along the line 18—18 of Fig. 16;

Fig. 19 is a fragmentary view of the lowermost portion of Fig 16 illustrating the selection of a perfect assembly;

Fig. 20 is a vertical sectional view taken substantially along the line 20—20 of Fig. 19;

Fig. 21 is a vertical sectional view taken substantially along the line 21—21 of Fig. 19;

Fig. 22 is a perspective view of the selector mechanism in the second embodiment of the invention;

Fig. 23 is a vertical sectional view taken substantially along the line 23—23 of Fig. 14 and illustrating the formation of a protuberance on the shank of the screw permanently to trap a washer thereon;

Fig. 24 is a view taken from the top of Fig. 23 and showing the parts on an enlarged scale; and Fig. 25 is a view of a permanently assembled screw and washer.

*Nut and washer assembling embodiment*

Figure 1:
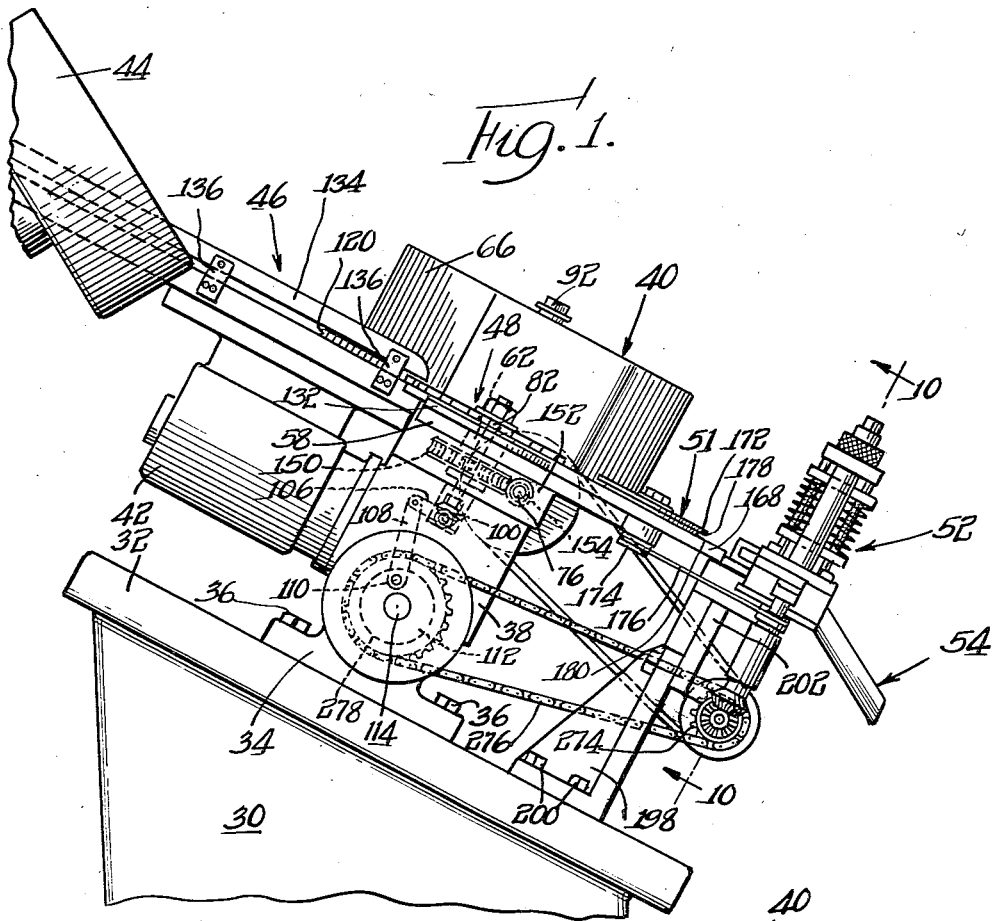
Fig. 1 is a side view of a machine incorporating the principles of the present invention and operating on nut elements and washers.
Figure 2:
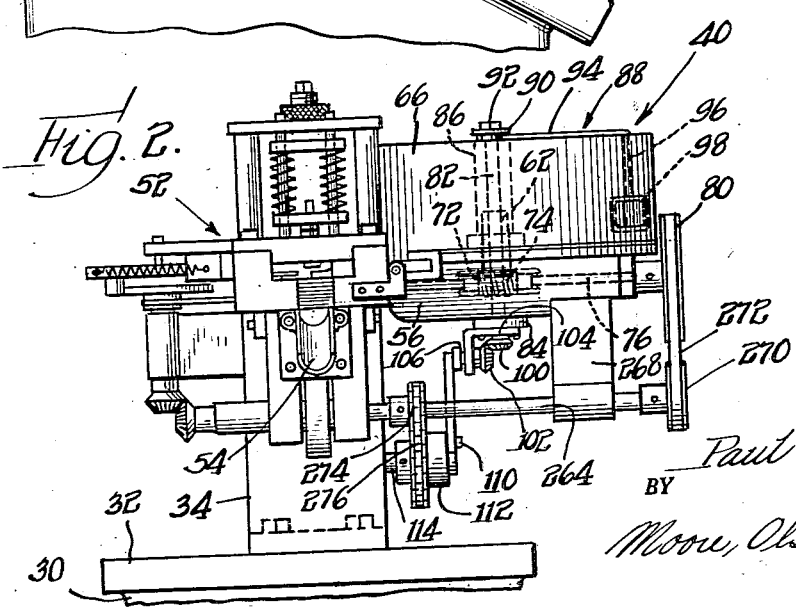
Fig. 2 is an end view of the machine taken from the right of Fig. 1.

Referring now in greater particularity to the figures, and first to Figs. 1–3 for a general understanding of my machine, the machine will be seen to include a main frame or pedestal 30 having a top inclined surface or table 32. An auxiliary supporting frame 34 is secured to the table 32 by means such as bolts 36 passing through flanges on the auxiliary frame and threaded into the table 32. The auxiliary frame 34 supports a gear box 38 and a washer hopper 40. An electric motor 42 is mounted on the end of the gear box 38 and drives speed reducing gears therein.

A nut element hopper 44 is supported from the main frame or pedestal 30 by any suitable structure (not shown) and may be of any suitable type for supplying nut elements of the type having a stub shaft or axially extending flange, neck, or skirt from a random mass to an inclined feed chute 46. The chute 46 delivers nut elements in succession to a rotary feed wheel or disc 48 which cooperates with a rotary feed wheel or disc 50 in the washer hopper 40 telescopically to assemble nut elements and washers.

Perfect and imperfect assemblies and loose nut elements and washers are fed from the assembly mechanism comprising the aforementioned feed wheels or discs to a selector 51 which segregates the perfect and imperfect assemblies and loose nut elements and washers. Perfect assemblies are fed from the selector 51 to a staking unit 52 which stakes the assemblies permanently together by swaging a portion of each nut element into interlocking relation with the washer assembled therewith. The permanent assemblies then are discharged through a chute 54.

The washer hopper

The washer hopper 40 comprises a cup-like base or casing preferably in the form of a casting 56 having a flat top 58 (see also Figs. 4 and 5). A circular wear plate 60 (Figs. 3–5) is fixed in any suitable manner to the upper surface of the top 58. A hollow shaft 62 extends upwardly from inside the casting 56 through the top 58 and through the wear plate 60. The rotary washer feed plate or disc 50 is secured to this hollow shaft in any suitable or desirable manner for driving the same. The disc 50 as may be seen in Figs. 3–5 is tapered outwardly to form a relatively thin peripheral edge having equally arcuately spaced recesses 64 of suitable transverse dimension to receive a washer.

A substantially circular peripheral wall 66 substantially encircles the wear plate 60 and extends upwardly therefrom, being secured to the top 58 in any suitable or desirable manner. The wall 66 is not quite a complete circle, but is cut in substantially chordally at 68 and then is curved inwardly along a smaller concentric arc at 70. The arcuate wall portion 70 is supported by an overlying flange or wall 71 suitably fixed to the adjacent portion of the wall 66.

The hollow shaft 62 (Figs. 1 and 2) is provided at its lower end with a worm wheel 72 (Figs. 2 and 3) within the housing or casting 56. A worm 74 on a rotatable shaft 76 drives the worm wheel. The shaft is journaled in suitable bearings, one of which is positioned in a hub 78 outstanding from the side of the housing or casting 56. The shaft 76 is driven by a pulley 80 as will hereinafter be brought out more fully.

A shaft 82 extends concentrically upwardly within the hollow shaft 62 (Figs. 1 and 2) from beneath the casing or housing 56 at which point the shaft is suitably journaled in a hub or bearing block 84 on the under side of the casing or housing. The shaft 82 extends substantially to the top of the peripheral wall 66 and is encircled by a sleeve or collar 86 which supports a washer agitator 88. The washer agitator 88 comprises a wire member looped around the shaft 82 at the top of the sleeve 86 and held down by a washer 90 and bolt or cap screw 92. The agitator 88 extends substantially radially outwardly from the shaft 82 in the form of a pair of diverging arms 94. The wire member comprising the arms 94 extends downwardly as at 96 toward its outer ends and is bent into loops 98 extending adjacent the surface of the disc 50. The top of the shaft 82 may have a non-circular portion about which the agitator tightly fits, or the agitator may otherwise be suitably secured to the shaft for movement therewith.

A bevel gear 100 (Figs. 1 and 2) is fixed on the lower end of the shaft 82 and meshes with a bevel gear 102 on a stub shaft journaled in an angle bracket 104 fixed to the hub or bearing block 84. A crank or rocker arm 106 is fixed to the stub shaft and is pivotally connected to a connecting rod 108. The other end of the connecting rod 108 is connected to a crank pin 110 extending from the end of a disc 112 on a shaft 114 extending from the gear box 38. Rotation of the shaft 114 and disc 112 causes the connecting rod 108 to be moved up and down to rock or oscillate the stub shaft. This acts through the bevel gears 102 and 100 to oscillate the shaft 82 which oscillates the agitator 88 to keep a mass of loose washers in the hopper 40 stirred up for efficient feeding. The washers 116 to be handled by the hopper are shown in detail in Figs. 7 and 8 and comprise circular sheet metal discs of concave-convex configuration, i. e. the washers are dished. The washers are provided with necks, skirts, or flanges 118 extending substantially axially or frusto-conically upwardly around the center holes thereof.

The nuts to be assembled with the washers also are shown in detail in Figs. 7 and 8 and are identified by the numeral 120. The nuts are provided with axially extending stub shafts or flanges 122 designed to fit within the washer skirts or flanges 118. Annular grooves 124 encircle the nut stub shafts 122 for receiving the washer skirts or flanges 118. In Fig. 7 the nut and washer assemblies are shown as telescoped and loosely assembled. In Fig. 8 they are shown after they have been permanently staked together by outward swaging of the nut stub shaft or flange 122 beneath the skirt or flange 118 of the washer 116. Both the temporarily assembled and permanently assembled nut elements and washers hereafter will be identified as assemblies 126.

Rotation of the disc 50 along with agitation of the mass of washers 116 by the agitator causes the washers to tend to settle in the recesses 64 as the edge of the disc passes beneath the mass of washers. The washers with their flanges oriented upwardly tend to seat firmly in the recesses and to be carried upwardly upon rotation of the disc, whereas those with their flanges oriented downwardly cannot seat securely in the recesses and tend to fall gravitationally from the recesses as the disc rotates. A deflector member 128 (Fig. 3) is suitably affixed to the peripheral wall 66 and is provided with fingers 130 extending inwardly above the surface of the disc 50. The bottom of each of the fingers 130 is formed complementary in shape to the convex faces of the washers 116 including the flanges 118 thereon so that washers which are oriented with their flanges upwardly directed can pass beneath the fingers. Upside down washers, i. e. those with their concave faces upwardly directed and their flanges downwardly directed, that are not displaced from the recesses 64 by gravity are deflected from the recesses by the fingers 130 to drop back into the mass of washers 116 where they likely will be inverted by agitation with the mass and will then be picked up with their flanges upwardly directed.

The nut element feeding mechanism

The nut element feed chute 46 which receives nut elements 120 with the stub shafts or flanges down as aforenoted is substantially in the form of a channel abutting a plate 132 (Figs. 1 and 3) at its lower end. A rail 134 preferably is carried above the center of the channel by brackets 136 to maintain the nut elements properly seated in the channel. The nut element rotary feed wheel or disc 48 is positioned at the discharge end of the channel and is substantially contiguous therewith, the channel being suitably relieved to provide clearance for the disc 48. The disc 48 is provided with arcuately spaced peripheral recesses 138 for receiving the nut elements 120 from the feed chute 46. The disc 48 is driven continuously and nut elements in the chute are held by the periphery of the disc until a recess reaches substantial alignment with the chute 46 at which time the first or lowermost nut element drops into the recess as shown in Fig. 3. The remainder of the nut elements in the chute then are supported by the first nut and the periphery of the disc 48 until the next succeeding recess reaches substantial alignment with the chute.

The plate 132 may rest on top of an extension of the plate 58 as shown in Figs. 4 and 5 and may be secured thereto in any desirable manner. A sleeve or bearing 140 is suitably mounted in the plates 132 and 58 and a shaft 142 carrying the disc 48 is suitably journaled therein. A circular wear plate 144 spaces the disc 48 above the plate 132. The disc 48 is keyed or otherwise suitably fixed to the shaft 142 for rotation therewith and is held on the end of the shaft by a washer 146 and a bolt or cap screw 148.

A worm wheel 150 (Figs. 1 and 3) is fixed on the lower end of the shaft 142 within a housing or gear box 152 beneath the plates 132 and 58. A worm 154 on the shaft 76 drivingly engages the worm wheel 150 for driving the disc 48 in timed relation with the disc 50 and in the opposite angular direction.

The worm drive for the two discs allows them to be moved nearer or farther for replacing one or the other of the discs with a disc or discs of different sizes, or to change the relative speeds of the discs if it is desired to vary the relative number of recesses therein simply by replacing one or both of the cooperating sets of worms or worm wheels and perhaps sliding the worms in either direction along the shaft 76.

*The assembling mechanism*

A thin, arcuate plate 156 (Figs. 3–6) extends from the bottom of the nut element feed chute 46 beneath the edge of the disc 48 substantially in contact therewith and has its lower edge spaced above the disc 50 where the two discs overlap. An arcuate retaining wall 158 is secured along side the arcuate plate 156 and is held in place by screws 160 passing through a depending arm 162 of the wall 158 and threaded into one or both of the plates 58, 132. The arcuate wall 158 extends substantially from the feed chute 46 where it has an outwardly turned tip 163 to the trailing edge of the arcuate plate 156 where it may be curved outwardly at 164 if so desired.

Nut elements 120 gravitationally passing from the feed chute 46 into the recesses 138 of the disc 48 slide along the top of the arcuate plate 156 as the disc rotates. The nut elements are restrained against movement outwardly from the recesses 138 by the arcuate wall 158. Any nut elements that tend to project outwardly from the recesses before reaching the wall 158 are cammed into the recesses by the curved end 162. The discs 48 and 50 rotate in timed relation so that the nut elements 120 are carried into axial alignment with washers 116 where the discs converge. The nut elements and washers are moving in substantially the same direction at substantially the same speed and are substantially in alignment when the nut elements reach the trailing edge 166 (Fig. 6) of the supporting plate 156. As the nut elements pass this edge they drop from the position shown in Fig. 4 on to the washers as shown in Figs. 5, 6, and 7 to form a telescoped assembly 126. Both of the discs then are acting on the assembly and the assembly slides away from the two discs along the plate 60 as shown in Figs. 3 and 6.

*The selector mechanism*

The plate 60 is provided with an extension 168 (Figs. 1, 3, and 11) which may be formed integral therewith or which may be attached thereto. This plate comprises part of the selector 51 and has an upstanding shaft 170 journaled therein and carrying a selector disc 172 spaced above the extension plate 168. The shaft 170 carries a pulley 174 at its lower end for driving the disc by means of a belt 176 as will be brought out hereinafter. The periphery of the disc is undercut to provide an outer, upper edge 178 and a lower, inner edge 180. The disc is spaced above the plate 168 a sufficient distance so that loose or unassembled nut elements and washers can pass beneath the disc. Properly telescoped nut elements and washers, i. e. perfect assemblies, are higher and engage the inner, lower edge 180 which carries them around to a chute or track 182 having an assembly accommodating channel generally in the form of an inverted T. In other words, the channel is undercut so as to receive the assemblies with no chance of their being transversely or laterally displaced from the chute or track.

Imperfect assemblies which may be the result of imperfect nut elements or washers or canting of nut elements or washers are higher than the perfect assemblies and engage the outer, upper edge 178 beneath which the perfect assemblies pass. Counterclockwise rotation of the disc 172 causes the outer, upper edge 178 to carry the imperfect assemblies around to a tangent guide surface 184 at the upper end of the chute or track 182. The tangent surface 184 deflects imperfect assemblies off the side of the plate 168 where they may drop into a suitable disposal chute or container (not shown).

Loose nut elements gravitationally passing under the disc 172 engage the diagonally disposed upper edge 186 of a bridge member 188 and are deflected over the side 190 of the plate 168 into a receptacle 192. The bridge member 188 is undercut a sufficient distance above the plate 168 to pass loose washers, but not sufficiently high enough above the plate to pass the loose nut elements which are deflected by the diagonally disposed edge 188. Washers 116 drop off the lower edge 194 of the plate 168 into a discharge chute or receptacle 196.

*The staking unit*

Perfect assemblies 126 passing down the chute or track 182 are delivered to the staking unit 52 shown in general in Figs. 1–3 and in detail in Figs. 9–13. The staking unit 52 is supported by a bracket 198 bolted to the table 32 by means such as bolts 200 and also bolted to a depending framework 202 on the staking unit. The lower or discharge end of the chute or track is suitably fixed to the bottom edge of the staking unit for supporting the chute or track 182. The discharge end of the chute or track 182 has the top portion cut away and interfits with a guideway 204 having a portion removed from the bottom of the upper edge thereof. The guideway 204 comprises a preferably integrally formed supporting plate 206 and a pair of side rails or guides 208.

Both the track or chute 168 and guideway 204 are supported on the upstanding upper edge of the bracket 198 and on a spacer plate 209 (Fig. 11) by bolts 210 passing through the bracket and threaded into the bight portion 212 of a substantially U-shaped body 214 having forwardly extending side walls 216 (Fig. 10). The forwardly extending side walls 216 of the U-shaped body portion 214 are provided with four upstanding posts 218 (Figs. 9 and 10) for supporting the upper part of the staking unit as will be apparent hereinafter.

A T-shaped retainer 220 (Fig. 11) has the arms 222 of the T secured in recesses in the front edges of the side walls 216 by means such as bolts 224 with the leg 226 of the T extending within the central portion of the U-shaped body 214 and defining therewith a rectangular slideway 228 (Figs. 10 and 11).

A rectangular slide 230 is reciprocably mounted in the slideway 228 and a staking pin 232 is mounted in a recess in the upper end thereof by any suitable means such as a set screw 234. The staking pin 232 has a reduced upper end 236 (Figs. 10, 11, and 13). A frustoconical tip 238 on the reduced end portion forms a shoulder therewith and is provided at its upper end with a pilot 240. The reduced upper end 236 of the staking pin 232 is adapted to pass through an aperture 242 (Figs. 9–12) in the supporting plate 206 displaced transversely of the longitudinal channel between the side rails 208.

A pair of T-shaped guides 242 (Figs. 10 and 11) are fixed on the opposite outside surfaces of the side walls 216 of the U-shaped body 214 by means such as screws 244 passing through the extremities of the arms of the T. The stems of the T-shaped members 242 are provided with cylindrical bores aligned with similar recesses 246 in the top part of the U-shaped body which extends outwardly in the form of ears 248. Pin holders 250 fit in the bores in the T-shaped members 242 and are provided with shanks 251 of reduced diameter extending upwardly through the bores. Coil springs 253 are trapped in the bores and the recesses 246 and encircle the shank 252 to urge the pin holders 250 downwardly.

A pin 252 (Figs. 10 and 11) extends transversely through the slide 230 and extends outwardly through elongated slots 254 in the side walls 216. Reduced end portions 256 of the pin are received in U-shaped openings in the lower ends of the pin holders 250.

The lower end of the slide 230 is bifurcated and a cam follower roller 258 is mounted between the bifurcations on a pin 260. A cam 262 is mounted between the free lower ends of the side walls 216 on a cam shaft 264 journaled in suitable bearings 266 in the side walls. Rotation of the cam shaft and consequently of the cam causes positive upward movement of the slide 230 and staking pin 232, while the parts are spring returned to their lowermost position by the springs 254. The cam shaft 264 also is journaled in a bearing in an arm 268 (Figs. 2 and 3), and is supported by auxiliary supporting frame 34. A pulley 270 on the outer end of the cam shaft 264 is connected by a belt 272 to the pulley 80 for driving the discs 48 and 50.

The cam shaft 264 further is provided with a sprocket 274 (see also Fig. 1) and a sprocket chain 276 drives the shaft 264 from a sprocket 278 on the cross shaft 114.

A plate 280 (Figs. 10 and 11) having a thickened or depending central portion 282 is fixed on top of the four posts 218 by means of bolts 284. A pair of cylindrical posts 286 (Figs. 3, 10, and 11) is provided with reduced lower ends which are threaded into the plate 280 adjacent the opposite ends thereof. A back-up plate 288 is fixed to the upper ends of the post 286 by means such as screws 290.

Four guide bars 292 extend through the back-up plate 288 and are threaded into the plate 280 in rectangularly spaced relation. An anvil plate 294 fits over the guide bars 292 and is slidable thereon. The anvil plate is centrally apertured for receipt of a reduced shank 296 the anvil 298 directly below the shank 296 and abutting the ceived in a sleeve 300 fitted in the plate 280. A pair of locking nuts 302 is threaded on the upper part of the anvil 298 directly below the shank 296 abutting the anvil plate 294 adjustably to determine the distance which the anvil extends below the anvil plate. The anvil 298 is aligned with the staking pin 236 and is provided with a flat lower end.

A presser plate 304 of similar configuration to the anvil plate slidably fits on the guide bars 292. Four coil springs 306 surround the guide bars 292 and are compressed between the presser plate 304 and the anvil plate 294. Abutment members 308 encircle the guide bars and receive the ends of the springs properly to center the springs about the guide bars.

A stud 310 is threaded through the back-up plate 288 and engages the presser plate 304 to force the presser plate down against the springs 306 to maintain the springs under compression. The stud is provided with a hexagonal head 312 or other suitable driving means for threadingly adjusting the stud to vary the distance the presser plate 304 is maintained below the back-up plate 288, and consequently to adjust the compression of the springs 306. A jam nut 314 is threaded on the upper end of the stud 310 to lock the same in adjusted position.

A cross shaped member 316 (Figs. 9 and 10) is fixed to a pair of legs 218 by means of screws 318 or the like, and extends between that pair of legs. The cross shaped member 316 is provided on its under side with a channel 320 which is closed on the bottom thereof by a plate 322 secured to the cross shaped member by any suitable means.

A transverse slide 324 (Figs. 9, 10, and 12) is reciprocably mounted in the channel 320 and held in place by the plate 322. The transverse slide 324 carries at its end a transverse carrier 326 which is set in a recess in the slide and is held in place by any suitable means such as a pair of screws 328. The carrier 326 is provided with a forwardly extending finger 330 and has a beveled upper edge 332.

A pin 334 (Figs. 3 and 9) extends through the opposite end of the transverse slide 324. Transverse pins 336 extend into the cross shaped member 316, and springs 338 are stretched between the pins normally to urge the slide to the right as viewed in Figs. 3 and 9. A cam follower roller 340 (Figs. 9 and 10) is mounted beneath the slide 324 on a stud 342.

A shaft 344 (Figs. 9 and 10) is suitably journaled in the cylindrical end 346 of an arm 348 which conveniently extends from the U-shaped body 214. The shaft 344 is provided at its lower end with a bevel gear 350 meshing with a bevel gear 352 on the cam shaft 264. The shaft 344 is provided adjacent its upper end with a pulley 354 which receives the belt 176 for driving the selector mechanism 51. A cam 356 is fixed on the upper end of the shaft 344 and engages the cam follower roller 340 to act with the springs 338 to reciprocate a transverse slide 324 and carrier 326 in timed relation with the movement of the slide 230 and staking pin 236.

A channel-shaped, transverse guide 358 (Figs. 3, 9, 11, and 12) is fixed across the guideway 204 and is provided with a cover plate 360 held in place by means such as screws 362.

An L-shaped actuating bar 364 (Figs. 3, 9, 10, and 11) is reciprocably mounted in the transverse guide 358. The transversely extending member 366 on the L-shaped actuating bar has its outer end spaced above the transverse slide 324 and is fixed thereto by means such as a screw 368 for reciprocating the actuating bar 364. The opposite end of the actuating bar 364 is reduced in height as at 370 (Fig. 9) and a tripper 372 (Figs. 3, 9, and 10) having a bifurcated end fitting over the reduced portion 370 is pivotally mounted on the actuating bar at 374. The tripper 372 is provided at its free end with a tooth 376 having a right angled shoulder 378 (Fig. 9) and an angularly disposed cam surface 380. The lower edge (as viewed in Fig. 9) of the reduced end portion 370 of the actuating bar 364 is formed with a square corner, while the upper edge is rounded off so that the tripper 372 can pivot upwardly and cannot be pivoted downwardly beyond a straight line with the long portion of the bar 364. A leaf spring 382 is fixed adjacent the end of the bar 364 by a clamping member and screws or rivets as illustrated at 384 and bears against a protuberance 386 on the tripper so as normally to hold the tripper in a straight line with the long portion of the bar 364.

A generally T-shaped positioning and ejecting member 388 (Figs. 3, 9, 10, and 12) is pivotally mounted at 390 at one end of one of the arms of the T by a bracket 392 secured on one side of the body 214 by means such as screws or bolts 393 (Fig. 10). The opposite arm of the T is provided at its extremity with a tooth 394 (Figs. 3, 9, and 12) having a cam surface 396 cooperable with the cam surface 380 of the tripper 372. The tooth also has a right angled shoulder 398 cooperable with the right angled shoulder of the tooth on the tripper. The stem 400 of the T-shaped positioning and ejecting member 388 extends between the adjacent posts 218 and normally engages the uppermost one of these two posts as viewed in Fig. 9. The end of the T stem is relieved at 402 as best seen in Fig. 12 and is provided with a relatively short projecting finger 404 and a relatively long finger 406 projecting parallel to the finger 404. The shorter finger 404 is located relatively nearer the assembly chute or track 182 as best seen in Fig. 9. The lower end of the rail 203 of the guideway 204 is relieved as at 408 to provide clearance for the finger 404.

A bracket 410 (Fig. 9) is secured to the lowermost of the two posts 218 adjacent the positioning and ejecting member by any suitable means such as screws and is provided with a spring centering pin 412 on its outer end and extending toward the positioning and ejecting member. A protuberance 414 is provided on the positioning and ejecting member opposite the pin 412 and a coil spring 416 encircles the protuberance 414 and the pin 412 and is compressed between the member 388 and the bracket 410.

Perfect assemblies sliding down the track or chute 182 from the selector 51 pass into the guideway 204 and successively come to rest against the forwardly extending finger 330 of the transverse carrier 326, the relieved edge 332 of the carrier insuring proper centering of the assemblies. Rotation of the cam 356 causes the springs 338 to shift the carrier to the right as viewed in Fig. 9, thus shifting the foremost assembly from the position shown in Figs. 9 and 10 to the position shown in dashed lines in Fig. 10 in alignment with the staking pin 236 and the anvil 298. The top edge of the carrier supports the remainder of the assemblies at this time. The carrier 326 engages only the nut element of each assembly as may be seen in Fig. 9 and carries the assemblies into the space between the fingers 404 and 406. Continued rotation of the cam 356 causes retraction of the slide 324 and of the carrier 326. The cam 262, which operates in timed relation with the cam 356, shifts the staking pin upwardly before retraction of the carrier 326. The pilot 240 enters the center hole of the nut element and insures proper centralization of the assembly 126 with the staking pin. The staking pin lifts the nut element slightly against the under side of the anvil 298 and the frusto-conical surface 238 of the staking pin swages the nut element flange 122 outwardly beneath the washer flange 118 permanently to trap the washer on the nut element.

When the carrier 326 advances, the L-shaped actuating bar 364 shifts with it and the tooth of the tripper 372 cams over the tooth 394 of the positioning and ejecting member. After the assembly has been staked by the staking pin 236, the cam 262 retracts the staking pin while the cam 356 retracts the carrier 326 and the actuating bar 364. The right angled shoulder on the tooth of the tripper then engages the right angled shoulder on the tooth of the ejecting and positioning member and pivots this member in a counterclockwise direction as shown in Fig. 9 to eject the permanent assembly by shifting it from the plate 206 into a discharge chute 54 previously referred to and shown in Figs. 1–3 and 11. Clearance is provided between the two teeth 376 and 394 as will be noted in Fig. 9 to allow the parts to operate in their proper timed relation.

The adjustable positioning of the anvil 298 by means of the nut 302 allows the anvil to be adjusted for very close spacing with the tops of the nut elements so that the assemblies will not be lifted very far by the staking pin before they encounter the anvil. The spring mounting of the anvil plate allows the anvil to give somewhat as the assemblies are staked so that assemblies of slightly different heights can be staked properly without danger of insecure staking or of damage to the staking unit.

*Screw and washer assembling embodiment*

Figure 14:
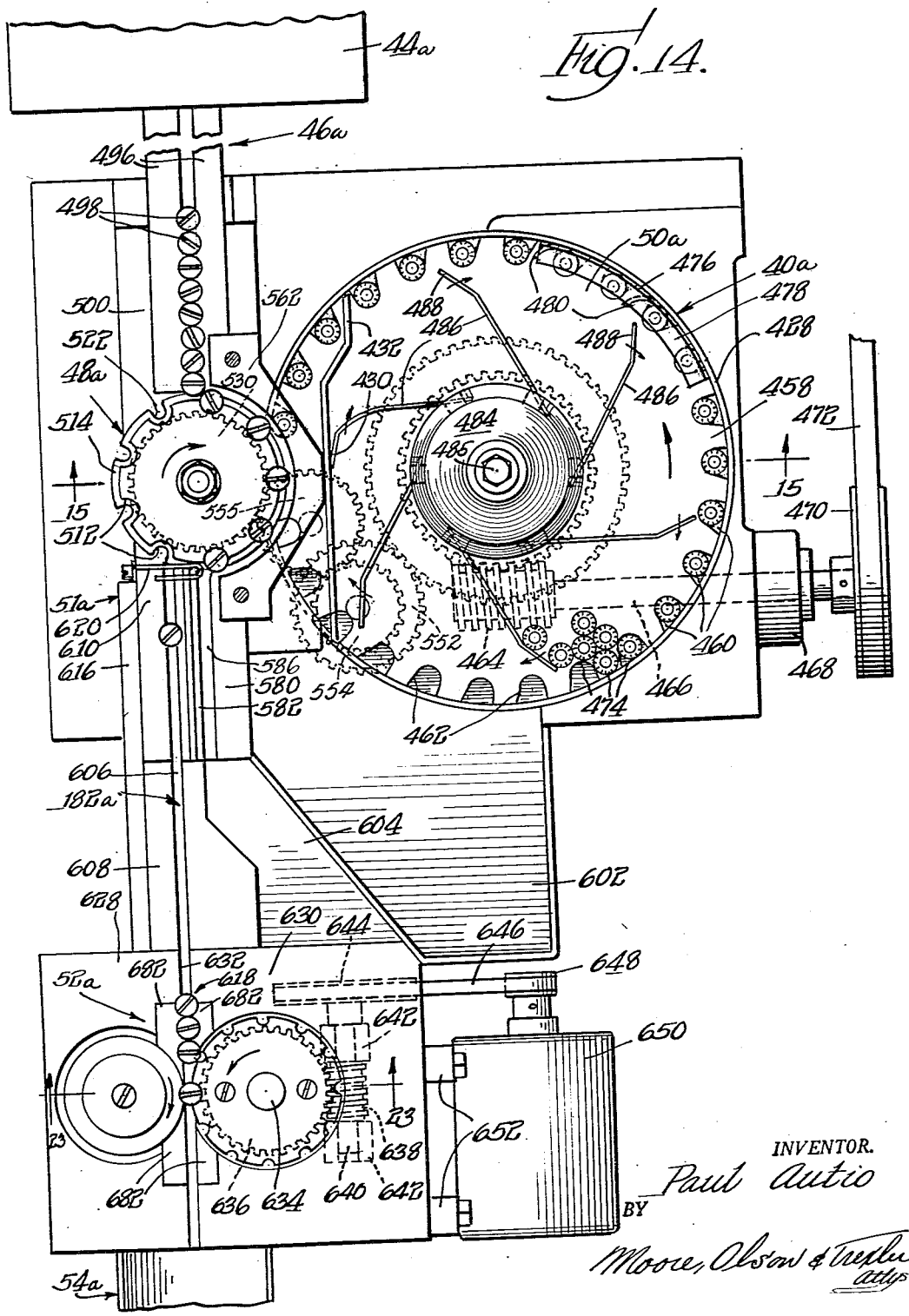
Fig. 14 is a top view of a machine for assembling screws and washers and is generally similar to Fig. 3.

The modification of the apparatus which is adapted to assemble screws with washers is shown in Figs. 14–25, and reference first should be had to Fig. 14 for a general understanding of the machine. The machine is generally similar to the one previously described, and similar parts will be identified by similar numerals with the addition of the suffix *a*. The machine includes a washer hopper 40*a* for selecting and feeding washers. In the case specifically illustrated the washers are lock washers of the type having radially extending twisted locking teeth, but it will be understood that other types of washers are contemplated. Screw elements are gravitationally fed with their shanks down through a track 46*a* from a hopper 44*a* of any desired type. It will be understood that screw elements are supplied to the hopper in a random mass, and many hoppers capable of selecting and feeding screws in succession from a random mass are known in the art, and it is therefore unnecessary to illustrate any particular one in detail.

The screw elements are fed from the chute 46*a* to a rotatable cylinder 48*a* arranged in overlapping relation with a washer carrying disc 50*a* in the washer hopper and forming therewith an assembling mechanism.

An assembly selector 51*a* is arranged adjacent the cylinder 48*a* for segregating assemblies and loose screw elements and washers. The assemblies are fed down a chute or track 182*a* to a swaging unit 52*a* for enlarging a portion of each screw element shank permanently to retain the washers assembled on the screw elements. The permanent assemblies so formed then are delivered to a discharge chute or receptacle 54*a* from which they may be transferred to a suitable thread rolling machine.

*The washer hopper*

An inclined table or supporting surface 418 (Fig. 15) is supported on a frame 420 in any suitable manner from a support which may be similar to the table 32 of the pedestal 30 previously described. A casing or housing 422, conveniently in the form of a casting, is mounted on the plate 418 in any suitable or desirable manner with a hub 424 on the casing depending through a suitable aperture in the plate.

A hardened metal ring 426 is suitably secured at the upper end of the casing 422, and a sheet metal peripheral wall 428 extends upwardly from the casing beyond the ring. The wall 428 is generally circular and is provided at the left side as viewed in Fig. 14 with a chordal portion 430 extending across and spaced above the ring 426. An offset portion 432 on the chordal portion of the wall extends into an abutment with the circular or cylindrical part of the wall properly to position the chordal portion 430.

A shaft 434 (Fig. 15) extends through the casing hub 424. A sleeve or hollow shaft 436 encircles the shaft 434 and is journaled in a bearing 438 in the casing hub 424. A worm wheel 440 is mounted about the sleeve or hollow shaft 436 and a suitable anti-friction bearing 442 of the type adapted to withstand end thrust is positioned between the hub 424 and the wheel 440. A collar 444 having a radially extending flange 446 is keyed to the hollow shaft 436 at 448 and is keyed to the worm wheel 440 at 450.

The collar 444 is held down against the worm wheel 440 which is in turn held down against the hub 424 by an arcuate flange 452 formed integral with the upper end of the hollow shaft 436. The disc 50*a* is supported on top of the flange 446 and a washer 454 is positioned on top of the disc 50*a* and a pin 456 secures the washer, disc, and flange 446 together for rotation as a unit. The disc is relatively thick at its center and tapers to a relatively thin edge 458. A plurality of outwardly opening edge recesses 460 is provided in equal arcuately spaced relation about the relatively thin edge 458 of the disc. The trailing edges of the recesses 460 are cut back somewhat as illustrated at 462 to facilitate movement of washers away from the disc after assembly with screw elements as will be apparent shortly.

A worm 464 (Fig. 14) is mounted on a worm shaft 466, and the shaft 466 is journaled in suitable bearings in a hub 468 of the base or casing 422. A pulley 470 is fixed on the shaft 466 and is driven from any suitable power source (not shown) by a belt 472 to rotate the disc 50a in a counterclockwise direction as viewed in Fig. 14. Rotation of the disc causes washers 474 dumped on the disc in a random mass to be picked up by the recesses of the disc and raised from the mass of washers. The top part of the machine as viewed in Fig. 14 is higher than the lower part as will be understood, and excess washers piled on top of the washers seated in the recess tend to be displaced by gravity to return to the mass at the bottom of the hopper.

A sheet metal finger 476 is held adjacent the hopper wall 428 near the upper edge of the disc by an arcuate block or bracket 478 by any suitable means such as screws (not shown). The finger 476, which may comprise one or more pieces, is provided with a plurality of tips 480 extending inwardly over the surface of the disc 50a and substantially in contact therewith. Excess washers or washers that are not squarely seated in their recesses 460 are displaced by the finger tips 480 if they have not already been displaced by gravity and slide back down the surface of the disc 50a to the random mass to be picked up later by the disc recesses 460.

The inner shaft 434 is provided with an enlarged head 482 having an axially threaded recess. A substantially dome-shaped support 484, which conveniently may have the top and cylindrical walls formed separately, rests on top of the head 482 and is held in place thereon by a bolt 485 extending through the top of the dome-shaped support 484 and threaded into the tapped axial bore in the head 482. The head 482 preferably is received in a recess in the top of the substantially dome-shaped support to reduce the over-all height of the support. A plurality of wire fingers 486 is affixed to the substantially dome-shaped support 484 adjacent the lower edge thereof in arcuately spaced relation, and the fingers extend outwardly substantially tangentially of the support 484 spaced a short distance above the disc 50a and substantially parallel thereto. The outer ends 488 of the fingers are deflected slightly to the rear.

Sleeve bearings 490 at opposite ends of the shafts maintain the shafts 434 and 436 in concentricity and a sprocket 492 is pinned on the lower end of the inner shaft 434 beneath the hollow shaft 436 for driving the inner shaft by means of a sprocket chain 494.

Rotation of the sprocket 492 causes rotation of the shaft 434 and of the support 484 and fingers 486 in a clockwise direction as shown in Fig. 14. This keeps the washers from piling up too high on top of one another and clumping together. The washers more readily settle into the recesses 460 when they are loosened up by the fingers 486. The rearwardly deflected tips 488 allow the fingers to flex more readily to prevent damage if there is any tendency for any of the washers to clump together against the hopper wall 428.

*The screw element feeding mechanism*

The hopper 44a as aforenoted may be of any conventional type adapted to deliver screw elements from a random mass in predetermined orientation to the feed chute 46a. The feed chute 46a is of conventional construction including a pair of parallel rails 496 spaced apart a sufficient distance to allow the shanks of screw elements 498 to hang between them while the screw elements are supported by their heads, the edges of which rest on the rails 496. A third rail (not shown) desirably is positioned above the space between the rails 496 a sufficient distance just to allow clearance of the screw heads to prevent popping up of the screw elements from their proper feeding position.

The lower or discharge end of the chute 46a is received on a block 500 (Figs. 14 and 15) which is mounted on the same plate 418 as supports the washer hopper 40a. A shaft 502 is journaled in sleeve bearings 504 in a vertical bore in the block 500 and is provided with an enlarged cylindrical flange or collar 506 which may be formed integral with the shaft 502 or suitably fixed thereto. The flange 506 rests on a bearing ring 508 at the top of the bearing 504. A circular wear plate 510 of hardened metal encircles the flange or collar 506 and is affixed to the top of the block 500 by screws or by any other suitable means.

The rotatable cylinder 48a is mounted on the upper end of the shaft 502 and is provided with vertically extending, equally arcuately spaced grooves or recesses 512 for receiving screw elements as will be apparent shortly. A plate 514 of slightly larger diameter than the cylinder 48a is positioned beneath the cylinder and is clamped against the flange or collar 506 by the cylinder. The cylinder is forced down on the shaft by a nut 516 threaded on the upper end of the shaft and impinging against a washer 518.

A stud or pin 520 extends upwardly from the flange or collar 506 through an aperture in the plate 514 and into a bore in the cylinder 48a to drive the plate and cylinder as a unit with the shaft 502. The plate 514 is provided with arcuately spaced outwardly opening edge recesses 522. The recesses 522 are axially aligned with the grooves or recesses 512, but are of different diameter. The grooves 512 are of sufficiently large diameter to receive the heads of the screws 498, while the recesses 522 are of smaller diameter and are adapted to receive the shanks of the screw elements without allowing passage of the screw element heads.

A spacer plate 524 (Fig. 15) is fixed to the under side of the table or plate 418 in any suitable fashion and is provided with an opening encircling the shaft 502 and aligned with a similar opening in the plate 418. A bearing sleeve 526 extends through the aligned openings in the two plates and supports a sleeve bearing 528 in which the shaft 502 is journaled. A gear 530 is pinned on a reduced portion 532 of the shaft 502 for driving the shaft and is spaced from the sleeve 526 by a bearing washer 534.

A sprocket 536 is pinned on a further reduced portion 538 at the end of the shaft 502 and engages the sprocket chain 494 for driving the same.

An idler gear structure 540 is rotatably mounted on a stub shaft 542 having an enlarged head or flange 544 and further having a reduced end 546 threaded into the plate 524. A sleeve bearing 548 is interposed between the stub shaft 542 and the idler gear structure 540, while a bearing ring 550 is interposed between the idler gear structure and the plate 524. The idler gear structure 540 comprises a relatively large gear 552 and a relatively small gear 554. The gears are pinned together as at 556 for rotation as a unit and the small gear meshes with an idler gear 555 (Figs. 13 and 14) meshing with the gear 530 on the shaft 502 to drive the same. The larger gear 552 meshes with a gear 558 keyed to the hollow shaft 436 as at 560. Driving of the shaft 502 from the shaft 436 through the intermediary of the gears 558, 552, 554, and 530 causes the cylinder 48a to rotate in the opposite direction relative to the disc 50a. Driving of the inner concentric shaft 434 by means of the sprockets 536 and 492 and the sprocket chain 494 causes the support 484 and fingers 486 to rotate reversely of the disc 50a to keep washers on the disc thoroughly stirred up.

*The screw element and washer assembling mechanism*

A retainer 562 (Figs. 14–16) is secured to the block 500 at the bottom of the feed chute 46a, the feed chute being relieved to accommodate the member, and is further fixed to a block or spacer 564 (Fig. 22) adjacent the lower side of the cylinder 48a. The retainer member 562 comprises a pair of legs 566 (Figs. 16 and 22) through which bolts 568 are passed to mount the retainer member. The posts are interconnected by a bridge 570 (Figs. 15 and 16) which is provided with an arcuate inner surface spaced a short distance from the cylinder 48a and which is spaced above the top face of the disc 50a adjacent the region where the cylinder overlaps the disc. The retainer member 562 is provided with an arcuate lip 572 extending radially inwardly toward the plate or disc 514 at the bottom of the cylinder 48a to cooperate with this plate in supporting screw elements by their heads as may be seen in Fig. 15. Lip 572 also serves to support the shank of the screw against lateral movement, as seen in Fig. 17.

A thin supporting plate 574 (Figs. 15 and 16) underlies the plate 514 on the bottom of the cylinder 48a and also underlies the retainer member from the discharge end of the chute 46a to a position just short of 90° in a clockwise direction (as viewed in Fig. 16) from the center of the chute 46a. At this point the cylinder 48a overlaps the disc 50a by nearly the maximum amount of overlap. The plate 574 also lies above the disc 50a so that screw elements 498 which pass from the chute 46a into the grooves 512 of the cylinder 48a are slidingly supported on the plate 574 as shown in Figs. 16 and 17. The plate 574 is spaced a considerable distance below the supporting surface of the chute 46a so that screw elements with relatively long shanks can be accommodated, and the relatively great height of the cylinder 48a allows screw elements of different lengths to be handled without adjustment. The disc 50a and cylinder 48a rotate in timed relation as a result of their geared interconnection and washers 474 and screw elements 498 are moving at substantially the same rate and substantially the same direction as they are brought into alignment just as each screw element drops off the bottom edge of the plate 574 to telescope with the washer aligned therewith as shown in Figs. 15 and 18.

The block 564 may be generally of the same shape as the support member 562 and is positioned beneath it. The block 564 carries a wear plate 576 (Figs. 15-18, and 22) which fits into a recess in the ring 426 as shown in Figs. 15 and 16 and is shaped arcuately along its inner edge as at 578 (Figs. 17 and 18) in proximity to the wear ring 510 at least in the region adjacent the lower right hand quadrant of the cylinder 48a. The plate 576 is spaced from the ring 510 sufficiently to provide clearance for the shanks of the screw elements 498 after partial telescoping thereof with the washers 578 as shown in Fig. 18, while the plate 576 and ring 510 coact to support the washers 474.

The lip 572 has an extending arm formed integrally therewith or otherwise and forming a rail 580 (Figs. 14, 16, 19, 20, and 22). A second rail 582 is disposed parallel to the rail 580 and is spaced therefrom a sufficient distance to accommodate screw element shanks while supporting screw element heads for slidably feeding screw elements. The rail 582 is provided at its right side as viewed in the figures with a relatively high supporting surface 584 on the same level as the top surface of the rail 580 and forming therewith a feed chute 586. The upper end of the rail 582 is spaced only a short distance from the periphery of the plate 514, the spacing being just enough to permit passage of the shanks of screw elements 498 carried in the recesses 522. A center strip 587 extends longitudinally down the rail 582 and extends slightly above the surface 584. The upper end of the strip is terminated short of the upper end of the rail to provide clearance for the heads of screw elements 498 carried in the recess 522. The rail 582 is provided on the opposite side of the strip 587 from the surface 584 with a supporting surface 588 which is lower than the surface 584 and is positioned substantially on a level with the bottom face of the plate 514. Both of the upper corners of the rail 582 are rounded off as is the corner where the lip 572 joins the rail 580.

A substantially arcuate spring 590 (Figs. 16-21) is stationarily mounted adjacent the under side of the plate 514 by means such as a bracket 592 (Fig. 16) on the wear ring 510. The spring spirals slightly outwardly and adjacent its free end tends to extend across the space between the wear ring 510 and the wear plate 576. This urges screw elements into the track 586 so that they can readily move into the track without jamming while the cylinder 48a is rotating. The trailing edge of the spring is bent slightly backwardly to prevent damage to the spring and to the shanks of screw elements.

The upper end of the rail 580 is recessed and receives a carrier finger 594 (Figs. 16 and 19-21) pivotally mounted on a pin 596 and biased into the position shown in Fig. 16 by a spring 598 bearing against the tail end of the finger. In this position the finger forms a continuation of the rail 580.

The finger 594 is positioned so that it is on the same level as washers telescoped with the screw elements 498 as the washers are fed along the wear ring 510. The finger is provided with a concave free end 600 positioned to intercept the washers as they are carried along with the screw elements. As the washers successively engage the concave tip 600 of the finger 594 the finger pivots to the position shown in Figs. 19-21, thus bridging the track 586 to prevent the telescoped screws and washers from passing down this track.

Loose washers that are not assembled with screw elements pass beneath the arcuate bridge portion 570 of the support member 562 as shown at 474d in Fig. 16 to drop into a receptacle 602. Loose screws that are not assembled with washers are urged into the track 586 by the spring 590 and pass down the track 586 to a receptacle 604.

Washers which are telescoped with screw elements are held by the screw elements from passing under the support 562, and the screw elements so telescoped are kept from passing down the track 586 by the finger 594 engaging the washers.

The upper end of the rail 582 is recessed at 605 (Fig. 22) to permit passage of washers assembled with screw elements, and the telescoped or assembled screw elements and washers pass from the cylinder 48a and plate 514 into a track 606 (Figs. 14, 16, 20, and 22) forming a part of the chute 51a. The track 606 is defined by the rail 582 and a rail 608 (Figs. 20 and 22) parallel thereto and spaced therefrom. An insert 610 (Figs. 14, 16, 19, 20, and 22) is recessed in the rail 608 near the upper end thereof and is provided with an arcuate upper end 612 (Figs. 16 and 19) in contact with the wear ring 510. A lateral projection 614 adjacent the arcuate upper end is fileted into the main portion of the insert 610 and engages the shanks of screw elements to deflect the telescoped or assembled screw elements and washers into the track 606.

A strengthening and rigidifying bar 616 (Figs. 14, 16, 19, and 22) is affixed to the side of the rail 608 in any desirable manner, and may have a flange (not shown) thereon extending under the rails 582 and 580 for holding the same together if it is so desired. The bar 616 may be affixed to any suitable bracket for supporting the chute 51a and associated structure from the underlying supporting table or other structure (not shown).

As the telescoped or assembled screw elements and washers, hereinafter termed assemblies 618, reach the track 606 they are not quite completely telescoped. Means has been provided for insuring proper telescoping to the fullest extent at this point to prevent the production of defective assemblies. This means comprises a spring wire 620 (Figs. 14, 16, 19, 20, and 22) fastened on the side of the rail 608 by a screw 622. The spring wire 620 has a portion 623 (Fig. 22) extending upwardly from the screw 622, and then has a portion 624 extending across the rails 608 and 582 and doubled back at 626. The doubled back portion 626 is at a lower elevation than the transverse portion 624 and is curved to engage the heads of screw elements as they proceed into the upper end of the track 606. This doubled back portion 626 urges the screw elements downwardly so that they are permanently impelled into fully telescoped relation with the washers 474 upon leaving the recesses of the cylinder 48a and plate 514.

The swaging unit

The screw elements 498 heretofore illustrated will have been observed to be screw blanks, i. e. there are as yet no threads on the screw shanks. Subsequent rolling of threads on the shanks increases the shank diameter so that the washers assembled with the screw elements are permanently trapped on the screw elements. The apparatus heretofore disclosed is capable of assembling screw elements and washers at a greater rate than threads can be rolled by any known thread rolling machine. Accordingly, the staking unit 52a is provided for forming an enlarged section on each shank to hold the assemblies together until such time as threads are rolled on the screw blank shanks. The sections are rolled out in a subsequent thread rolling operation without in any way impairing the formation of the threads.

The swaging unit 52a as shown generally in Fig. 14 and more particularly in Figs. 23 and 24 comprises supporting blocks or plates 628 and 630 spaced apart to define a track 632 which is arranged as a continuation of the feed chute 182a.

A shaft 634 is rotatably journaled in the block 630 and is provided at its lower end with a worm wheel 636 meshing with, and driven by, a worm 638. The worm 638 is fixed on a worm shaft 640 journaled in suitable bearings 642 on the under side of the block 630. A pulley 644 is fixed to the worm shaft 640 and is driven by a belt 646, the belt being driven by a pulley 648 on the shaft of a motor 650. The motor is mounted on suitable support means 652 which are carried in any desired manner by the underlying table or support (not shown) or by any structure thereon. It will be understood that suitable drive connections could be provided from the same power source that drives the disc 50a and cylinder 48a and that the motor 650 then could be omitted.

A collar 654 (Fig. 23) is keyed to the shaft 634 near the upper end thereof, and a swaging or nicking wheel 656 is likewise keyed on the shaft and is fixed to the top of the collar by means such as screws 658. The collar 654 is rotatable in a relatively deep recess 660 in the block 630, while the swaging wheel 656 is rotatable in a shallower recess 662 of larger diameter.

The swaging wheel is provided with a plurality of arcuately spaced recesses 664, and the edge of the swaging wheel is beveled as at 666.

A shaft 668 is rotatably journaled in the block 628 with the line of centers of the shafts 634 and 666 perpendicular to the track 632. The upper end of the shaft 668 is provided with an enlarged head 670 fitting in a relatively deep recess 672. It will be understood that the head 670 may be integral with the shaft as shown, or may be in the form of a collar thereon. The collar 654 and shaft 634 likewise may be formed integrally if desired. A back-up wheel or disc 674 fits in a shallower recess 676 of larger diameter and is secured to the top of the shaft 668 by a screw 678 passing through a large, flat washer 680.

The top surfaces of the swaging wheel 656 and back-up wheel 674 are in a common plane which also contains the top surfaces of the blocks 628 and 630 so that the wheels may carry the assemblies 618. Inserts 682 may be provided in the surfaces of the blocks in order that the assemblies may be supported more closely to the wheels than would be possible otherwise.

As best may be seen in Fig. 24, rotation of the swaging wheel 656 causes the recesses 664 to engage the shanks 684 of the assemblies beneath the washers 474 to carry the assemblies forward. As the assemblies are carried between the swaging wheel 656 and back-up wheel 674, they engage the back-up wheel which forces the shanks 684 fully into the recesses. Although the recesses 664 are of substantially the same diameter as the screw blank shanks 684, the arcuate length of the recesses is somewhat less than a shank diameter due to flattened side portions 688 of the recesses. This reduced arcuate length causes small sections of metal or protuberances 690 to be swaged outwardly from the surface of each shank.

The swaging wheel is self-clearing as abutment of the shanks of the assemblies against the side of the block 630 pulls the assemblies from the recesses.

As may be seen in Fig. 25 the protuberances 690 extend outwardly beneath the washers 474 and permanently trap the washers on the screws. The assemblies 618 then pass gravitationally from the track 632 into the chute 54a.

Operation of the screw element and washer assembling embodiment

Operation of the individual steps has been set forth earlier and need not be repeated at great length. Washers are picked up from a random mass in the hopper 40a by the recesses of the disc 50a and are carried around beneath the overlapping edge of the cylinder 48a. Screw elements fed through the chute 46a from the hopper 44a are carried by the recesses of the cylinder 48a into alignment with the washers carried by the disc 50a, at which time the screw elements are dropped into telescopic association with the washers while screw elements and washers are moving at substantially the same rate in substantially the same direction.

If no screw element is supplied for telescopic association with a washer, then the washer passes out beneath the bridge portion 570 of the retainer member 562 and drops into the receptacle 602. Similarly, screw elements which are not assembled with washers are urged by the spring 590 into the track 586 down which the screw elements pass to the receptacle 604.

Assemblies of screw elements and washers are held in the recesses in the cylinder 48a and the attached plate 514 by the retainer member 562 and the pivotally mounted finger 594 to carry the assemblies to the track 606. The assemblies pass down this track to the swaging unit 52a where each shank is enlarged to permanently trap the washer on the screw element.

Summary

The invention disclosed herein is capable of assembling loose washers with fasteners at a higher rate of speed than heretofore thought possible. Movement of the washer feeding mechanism and the fastener feeding mechanism at uniform constant rates not only speeds production, but reduces the wear and tear caused by oscillating or intermittent motion. Only perfect assemblies are delivered from the machines as disclosed herein. Loose fasteners and washers and imperfectly assembled fasteners and washers are automatically separated from the perfect assemblies and from one another. Before discharge from the machines, the fasteners and washers are permanently trapped together by deforming a part of each fastener.

Throughout the claims it is to be understood that the term "washers" refers to apertured metal parts adapted for assembly with fasteners, and that the term does not refer only to the specific washers shown by way of illustration. The term "assemblies" is to be taken as referring to fasteners and washers which are at least partially telescoped with one another and which may or may not be permanently trapped together. When the limitation of permanent assembly is desired, terms such as "permanently assembled units" or "permanently assembled washers and fasteners" will be used, and it will then be understood that at least one of each cooperating fastener and washer has been deformed or otherwise permanently interlocked with the other to resist separation.

The specific embodiments of the invention herein shown and described are for illustrative purposes only. The invention is limited only by the spirit and scope of the appended claims.

I claim:

1. Apparatus for assembling fasteners and washers comprising means for positively feeding loose washers in succession along a predetermined path at a uniform constant rate, means for positively feeding fasteners in succession at the same uniform constant rate substantially into alignment with said washers and spaced above said washers, fastener supporting means interposed between said aligned washers and fasteners, means for operating the washer feeding means and the fastener feeding means in synchronism, said interposed means being interrupted for gravitationally shifting the aligned fasteners and washers past said interposed means relatively axially into telescoped engagement while said washers and fasteners are fed.

2. Apparatus for assembling fasteners and washers comprising means for receiving a random mass of washers, means for positively feeding loose washers in succession along a predetermined path from said random mass at a uniform constant rate, means for positively feeding fasteners in succession at the same uniform constant rate substantially into alignment with said washers and spaced above said washers, means for operating the washer feeding means and the fastener feeding means in synchronism, and fastener supporting means interposed between said aligned washers and fasteners, said interposed means being interrupted for permitting gravitational shifting of the aligned fasteners and washers relatively axially into telescopic engagement while said fasteners and said washers are fed.

3. Apparatus for assembling fasteners and washers comprising means for feeding a succession of washers along a curved path of predetermined radius, means for feeding a succession of fasteners along a second predetermined path axially displaced from the washer feeding path and having a radius differing from that of the first predetermined path, one of said paths overlapping the other, means for operating the washer feeding means and the fastener feeding means in timed relation to bring fasteners and washers into alignment with one another where said paths overlap with the fasteners overlying the washers, means interposed between the washer path and the fastener path for maintaining the washers and fasteners apart, said interposed means being interrupted at the overlap, whereby the fasteners drop gravitationally from the interposed means into telescopic association with the aligned washers.

4. Apparatus for assembling fasteners and washers comprising means for feeding a succession of washers along a predetermined curved path lying in a plane, means for feeding a succession of fasteners along a predetermined curved path lying in a different plane and not coincident with the washer path, one of said paths overlapping the other of said paths, means for operating the washer feeding means and the fastener feeding means in timed relation to bring fasteners and washers into alignment where the paths overlap with the fasteners overlying the washers, means interposed between the washer path and the fastener path for maintaining the washers and fasteners apart, said interposed means being interrupted at the overlap, whereby the fasteners drop gravitationally from the interposed means into telescopic association with the aligned washers.

5. Apparatus for assembling fasteners and washers comprising means for feeding loose washers at a uniform constant rate in succession along a predetermined curved path in a plane, means for feeding fasteners at the same uniform constant rate along a path curved reversely of the washer feeding path and in a second plane parallel to and spaced from the first plane, one of said paths overlapping the other, means for operating the washer feeding means and the fastener feeding means in synchronism to bring washers and fasteners into alignment at the overlap of said paths, means interposed between the washer path and the fastener path for maintaining the washers and fasteners apart, said interposed means being interrupted at the overlap, and means for relatively telescoping the aligned fasteners and washers.

6. Apparatus for assembling fasteners and washers comprising means for feeding washers in succession along a predetermined path, means for feeding fasteners in succession substantially into alignment with said washers along an overlapping path with the fasteners above the washers, means for operating the washer feeding means and the fastener feeding means in synchronism, means interposed between the washer path and the fastener path for maintaining the washers and fasteners apart, said interposed means being interrupted at the overlap, whereby the fasteners drop gravitationally from the interposed means into telescopic association with the aligned washers, means for separating properly assembled fasteners and washers from those which are not properly assembled, and means deforming the fastener of each properly assembled washer and fastener as so separated to hold the fasteners and washers permanently in telescoped association.

7. Apparatus for assembling fasteners and washers comprising means for feeding washers in succession along a predetermined curved path, means for feeding fasteners in succession substantially into alignment with said washers over a curved path which is not coplanar nor aligned with said washer feeding path, said paths relatively overlapping with the fasteners above the washers, means for operating the washer feeding means and the fastener feeding means in synchronism, means interposed between the washer path and the fastener path for maintaining the washers and fasteners apart, said interposed means being interrupted at the overlap, whereby the fasteners drop gravitationally from the interposed means into telescopic association with the aligned washers, and means for deforming one of each fastener and washer of each assembly so produced permanently to trap the fastener and washer together.

8. Apparatus for assembling fasteners and washers comprising means for feeding washers in succession along a predetermined path, means for feeding fasteners in succession substantially into alignment with said washers over a curved path which is not coplanar nor aligned with said washer feeding path, said paths relatively overlapping with the fasteners above the washers, means for operating the washer feeding means and the fastener feeding means in synchronism, means interposed between the washer path and the fastener path for maintaining the washers and fasteners apart, said interposed means being interrupted at the overlap, whereby the fasteners drop gravitationally from the interposed means into telescopic association with the aligned washers, means receiving assemblies for selecting perfect assemblies so formed, and means receiving perfect assemblies so selected for deforming one of each fastener and washer forming an assembly for permanently trapping the fastener and washer together.

9. Apparatus for assembling fasteners and washers comprising rotary feed means rotatable about an axis inclined from the vertical at an acute angle and having a plurality of outwardly and upwardly opening edge recesses adapted to receive washers from a random mass on top of said rotary feed means for feeding washers along an arcuate path, rotary feed means rotatable about an axis parallel to the axis of the washer feed means and spaced radially therefrom, said last named feed means overlapping the washer feed means and having a plurality of outwardly opening edge recesses adapted to receive fasteners for feeding said fasteners along an arcuate path overlapping the path of said washers, means for operating the washer feed means and the fastener feed means in timed relation to bring fasteners and washers into alignment, means interposed between the washer path and the fastener path for maintaining the washers and fasteners apart, said interposed means being interrupted at the overlap, and means for relatively telescoping the aligned fasteners and washers.

10. Apparatus for assembling fasteners and washers comprising rotary feed means rotatable about an axis inclined from the vertical at an acute angle and having a plurality of outwardly opening edge recesses adapted to receive washers from a random mass on top of said rotary feed means for feeding washers along an arcuate path, rotary feed means rotatable about an axis parallel to the axis of the washer feed means and spaced radially therefrom, said last named feed means being axially spaced from and overlapping the washer feed means and having a plurality of outwardly opening edge recesses adapted to receive fasteners for feeding said fasteners along an arcuate path overlapping the path of said washers, means for supporting fasteners in the recesses of the fastener feed means, and means for operating the washer feed means and the fastener feed means in timed relation to bring fasteners and washers into alignment, said fastener supporting means being interrupted to allow the fasteners to drop into telescopic engagement with the aligned washers.

11. Apparatus for assembling fasteners and washers comprising rotary feed means rotatable about an axis inclined from the vertical at an acute angle and having a plurality of outwardly opening edge recesses adapted to receive washers from a random mass on top of said rotary feed means for feeding washers along an arcuate path, means extending radially across the top of said washer feed means and adapted to engage a random mass of washers on top of said rotary feed means, means for arcuately moving said washer engaging means for keeping a random mass of washers stirred up, fastener feeding means rotatable about an axis parallel to the axis of the washer feed means and spaced radially therefrom, said fastener feeding means overlapping the washer feed means and having a plurality of outwardly opening edge recesses adapted to receive fasteners for feeding said fasteners along an arcuate path overlapping the path of said washers, means for supporting fasteners in the recesses of the fastener feeding means, and means for operating the washer feeding and the fastener feeding means in timed relation to bring fasteners and washers into alignment, said fastener supporting means being terminated substantially at the overlap of said fastener feeding means and said washer feed means for dropping the fasteners into telescopic engagement with the aligned washers.

12. Apparatus for assembling fasteners and washers comprising rotary feed means rotatable about an axis inclined from the vertical at an acute angle and having a plurality of outwardly opening edge recesses adapted to receive washers from a random mass on top of said rotary feed means for feeding washers along an arcuate path, rotary feed means rotatable about an axis parallel to the axis of the washer feed means and spaced radially therefrom, said last named feed means being axially spaced from and overlapping the washer feed means and having a plurality of outwardly opening edge recesses adapted to receive fasteners for feeding said fasteners along an arcuate path overlapping the path of said washers, means for supporting fasteners in the recesses of the fastener feed means, arcuate retaining means adjacent the fastener feed means and extending to the overlap of said fastener feed means and said washer feed means for retaining fasteners in the recesses of said fastener feed means, and means for operating the washer feed means and the fastener feed means in timed relation to bring fasteners and washers into alignment, said fastener supporting means being terminated substantially at the overlap of said fastener feed means and said washer feed means to drop fasteners into telescopic association with the aligned washers.

13. Apparatus for assembling fasteners and washers comprising rotary feed means rotatable about an axis inclined from the vertical at an acute angle and having a plurality of outwardly opening edge recesses adapted to receive washers from a random mass on top of said rotary feed means for feeding washers along an arcuate path, rotary feed means rotatable about an axis parallel to the axis of the washer feed means and spaced radially therefrom, said last named feed means overlapping the washer feed means and having a plurality of outwardly opening edge recesses adapted to receive fasteners for feeding said fasteners along an arcuate path overlapping the path of said washers, means for supporting fasteners in the recesses of the fastener feed means, means for operating the washer feed means and the fastener feed means in timed relation to bring fasteners and washers into alignment, said supporting means being terminated substantially at the overlap of said fastener feed means and said washer feed means to drop fasteners into telescopic association with the aligned washers, and arcuate retaining means adjacent said fastener feed means and extending in both directions from the overlap of said fastener feed means and said washer feed means to retain fasteners in the recesses of said fastener feed means and to pull telescopically associated washers from the recesses of said washer feed means.

14. Apparatus for assembling fasteners and washers comprising rotary feed means rotatable about an axis inclined from the vertical at an acute angle and having a plurality of outwardly opening edge recesses adapted to receive washers from a random mass on top of said rotary feed means for feeding washers along an arcuate path, rotary feed means rotatable about an axis parallel to the axis of the washer feed means and spaced radially therefrom, said last named means overlapping the washer feed means and having a plurality of outwardly opening edge recesses adapted to receive fasteners for feeding said fasteners along an arcuate path overlapping the path of said washers, means for supporting fasteners in the recesses of the fastener feed means, means for operating the washer feed means and the fastener feed means in timed relation to bring fasteners and washers into alignment, said fastener supporting means being terminated substantially at the overlap of said fastener feed means and said washer feed means to drop fasteners into telescopically assembled relation with the aligned washers, and means for selecting those of the assemblies so formed that are perfect.

15. Apparatus for assembling fasteners and washers comprising rotary feed means rotatable about an axis inclined from the vertical and having a plurality of outwardly opening edge recesses adapted to receive washers from a random mass on top of said rotary feed means for feeding washers along an arcuate path, rotary feed means rotatable about an axis parallel to the axis of the washer feed means and spaced radially therefrom, said last named means overlapping the washer feed means and having a plurality of outwardly opening edge recesses adapted to receive fasteners for feeding said fasteners along an arcuate path overlapping the path of said washers, means for supporting fasteners in the recesses of the fastener feed means, means for operating the washer feed means and the fastener feed means in timed relation to bring fasteners and washers into alignment, said fastener supporting means being terminated substantially at the overlap of said fastener feed means and said washer feed means to drop fasteners into telescopically assembled relation with the aligned washers, and means for deforming the fasteners to maintain the washers permanently assembled thereon.

16. Apparatus for assembling fasteners and washers comprising rotary feed means rotatable about an axis inclined from the vertical and having a plurality of outwardly opening edge recesses adapted to receive washers from a random mass on top of said rotary feed means for feeding washers along an arcuate path, rotary feed means rotatable about an axis parallel to the axis of the washer feed means and spaced radially therefrom, said last named means overlapping the washer feed means and having a plurality of outwardly opening edge recesses adapted to receive fasteners for feeding said fasteners along an arcuate path overlapping the path of said washers, means for supporting fasteners in the recesses of the fastener feed means, means for operating the washer feed means and the fastener feed means in timed relation to bring fasteners and washers into alignment, said fastener supporting means being terminated substantially at the overlap of said fastener feed means and said washer feed means to drop fasteners into telescopically assembled relation with the aligned washers, means for selecting those of the assemblies so formed that are perfect, and means for deforming a portion of one of each washer and fastener forming an assembly to maintain it permanently assembled with the other.

17. Apparatus for assembling washers and fasteners comprising a disc rotatable about an axis inclined from the vertical at an acute angle and having a plurality of outwardly opening edge recesses adapted to receive washers from a random mass on top of said disc for feeding washers along an arcuate path, a cylinder of substantial axial dimension rotatable about an axis parallel to the axis of the disc and spaced radially therefrom, said cylinder overlapping the disc and having a plurality of outwardly opening grooves extending longitudinally of the cylinder and adapted to receive screw elements parallel to the cylinder axis for feeding said screw elements along an arcuate path overlapping the path of said washers, means for supporting screw elements in the grooves of said cylinder, means for rotating the cylinder and the disc in timed relation to bring screw elements and washers into alignment, said supporting means being terminated at the overlap of said cylinder and said disc to drop screw elements into telescopic assembled relation with said washer, and arcuate retaining means adjacent said cylinder and extending in both directions from the overlap of said cylinder and said disc for retaining screw elements and assemblies in the grooves of said cylinder and for pulling washers assembled with screw elements from the recesses of said disc.

18. Apparatus for assembling fasteners and washers comprising rotary feed means having a plurality of outwardly opening edge recesses adapted to receive washers for feeding the washers along an arcuate path, rotary feed means rotatable about an axis parallel to the axis of the washer feed means and spaced radially therefrom, both of said feed means being inclined and overlapping and said last named feed means having a plurality of outwardly opening edge recesses adapted to receive fasteners for feeding said fasteners along an arcuate path relatively overlapping the path of said washers, means for operating the washer feed means and the fastener feed means in timed relation to bring fasteners and washers into alignment, means for relatively telescoping the aligned fasteners and washers, means for retaining the assemblies so formed in the recesses of one of said feed means, and inclined means for feeding free washers away from both of said feed means.

19. Apparatus for assembling fasteners and washers comprising rotary feed means having a plurality of outwardly opening edge recesses adapted to receive washers for feeding the washers along an arcuate path, rotary feed means rotatable about an axis parallel to the axis of the washer feed means and spaced radially therefrom, both of said feed means being tilted and overlapping and said last named feed means having a plurality of outwardly opening edge recesses adapted to receive fasteners for feeding said fasteners along an arcuate path relatively overlapping the path of said washers, means for supporting fasteners in the recesses of the fastener feed means, means for operating the washer feed means and the fastener feed means in timed relation to bring the fasteners and washers into alignment, said fastener supporting means being terminated substantially at the overlap of said fastener feed means and said washer feed means, arcuate means adjacent the fastener feed means and extending in both directions from the overlap of said fastener feed means and said washer feed means for retaining fasteners in the recesses of said fastener feed means and for withdrawing washers assembled with fasteners from the recesses of said washer feed means, and tilted means for feeding free washers away from both of said feed means, said fastener retaining means being spaced above said free washer feeding means to provide clearance for said free washers.

20. Apparatus for assembling fasteners and washers comprising rotary feed means having a plurality of outwardly opening edge recesses adapted to receive washers for feeding the washers along an inclined arcuate path, inclined rotary feed means rotatable about an axis parallel to the axis of the washer feed means and spaced radially therefrom, both of said feed means overlapping and said last named feed means having a plurality of outwardly opening edge recesses adapted to receive fasteners for feeding said fasteners along an arcuate path relatively overlapping the path of said washers, means for operating the washer feed means and the fastener feed means in timed relation to bring fasteners and washers into alignment, means for relatively telescoping the aligned fasteners and washers, inclined means for feeding free fasteners away from the fastener feed means, inclined means for feeding assemblies away from the fastener feed means, and means for directing the free fasteners and assemblies into their respective feeding means.

21. Apparatus for assembling fasteners and washers comprising rotary feed means having a plurality of outwardly opening edge recesses adapted to receive washers for feeding the washers along an arcuate path, rotary feed means rotatable about an axis parallel to the axis of the washer feed means and spaced radially therefrom, both of said feed means being inclined and overlapping and said last named feed means having a plurality of outwardly opening edge recesses adapted to receive fasteners for feeding said fasteners along an arcuate path relatively overlapping the path of said washers, means for operating the washer feed means and the fastener feed means in timed relation to bring fasteners and washers into alignment, means for relatively telescoping the aligned fasteners and washers, inclined means for feeding free fasteners away from said fastener feed means, means for feeding assemblies carried by said fastener feed means past said free fastener feeding means, and inclined means for feeding said assemblies away from said fastener feed means.

22. Apparatus for assembling fasteners and washers comprising rotary feed means rotatable about an axis inclined from the vertical and having a plurality of outwardly opening edge recesses adapted to receive washers from a random mass on top of said rotary feed means for feeding washers along an arcuate path, rotary feed means rotatable about an axis parallel to the axis of the washer feed means and spaced radially therefrom, said last named feed means overlapping the washer feed means and having a plurality of outwardly opening edge recesses adapted to receive fasteners for feeding fasteners along an arcuate path overlapping the path of said washers, means for supporting fasteners in the recesses of the fastener feeding means, means for operating the washer feed means and the fastener feed means in timed relation to bring fasteners and washers into alignment, said fastener supporting means being terminated substantially at the overlap of said fastener feed means and said washer feed means to drop fasteners into telescopic association with the aligned washers, a fastener feeding chute adjacent said fastener feeding means for feeding free fasteners away from the fastener feeding means, means for engaging the washer of each telescoped assembly to carry the assemblies past the fastener feeding chute, and an assembly feeding chute for feeding assemblies away from said fastener feeding means.

23. Apparatus as set forth in claim 22 wherein the means for engaging washers to carry assemblies past the fastener feeding chute comprises a member pivotally mounted at the entrance of said fastener feeding chute, and spring means biasing the pivotally mounted member out of the way of free fasteners.

24. Apparatus for assembling fasteners and washers comprising rotary feed means rotatable about an axis inclined from the vertical and having a plurality of outwardly opening edge recesses adapted to receive washers from a random mass on top of said rotary feed means for feeding washers along an arcuate path, rotary feed means rotatable about an axis parallel to the axis of the washer feed means and spaced radially therefrom, said last named feed means overlapping the washer feed means and having a plurality of outwardly opening edge recesses adapted to receive fasteners for feeding fasteners along an arcuate path overlapping the path of said washers, means for supporting fasteners in the recesses of the fastener feeding means, means for operating the washer feed means and the fastener feed means in timed relation to bring fasteners and washers into alignment, said fastener supporting means being terminated substantially at the overlap of said fastener feed means and said washer feed means to drop fasteners into telescopic association with the aligned washers, means for feeding free fasteners away from said fastener feed means, means for feeding free washers away from said fastener feed means, and means for feeding assemblies away from said fastener feed means.

25. Apparatus for assembling fasteners and washers comprising rotary feed means rotatable about an axis inclined from the vertical and having a plurality of outwardly opening edge recesses adapted to receive washers from a random mass on top of said rotary feed means for feeding washers along an arcuate path, rotary feed means rotatable about an axis parallel to the axis of the washer feed means and spaced radially therefrom, said last named feed means overlapping the washer feed means and having a plurality of outwardly opening edge recesses adapted to receive fasteners for feeding fasteners along an arcuate path overlapping the path of said washers, means for operating the washer feed means and the fastener feed means in time relation to bring fasteners and washers into alignment, means for relatively shifting the aligned fasteners and washers into telescopically assembled relation, means for retaining the assemblies in the recesses of said fastener feeding means, means for feeding free washers away from said fastener feed means, means for feeding free fasteners away from said fastener feeding means, and means for feeding the assemblies away from the retaining means and the fastener feeding means.

26. Apparatus for assembling fasteners and washers comprising rotary feed means rotatable about an axis inclined from the vertical and having a plurality of outwardly opening edge recesses adapted to receive washers from a random mass on top of said rotary feed means for feeding washers along an arcuate path, rotary feed means rotatable about an axis parallel to the axis of the washer feed means and spaced radially therefrom, said last named feed means overlapping the washer feed means and having a plurality of outwardly opening edge recesses adapted to receive fasteners for feeding fasteners along an arcuate path overlapping the path of said washers, means for supporting fasteners in the recesses of the fastener feeding means, means for operating the washer feed means and the fastener feed means in timed relation to bring fasteners and washers into alignment, said fastener supporting means being terminated substantially at the overlap of said fastener feed means and said washer feed means to drop fasteners into telescopic association with the aligned washers, arcuate means adjacent said fastener feed means and extending in both directions from the overlap of said fastener feed means and said washer feed means for retaining fasteners and assemblies in said fastener feed means, a washer slide plate spaced beneath said arcuate retaining means for feeding free washers away from said retainer feed means, a fastener feed chute for feeding free fasteners away from said fastener feed means, means for carrying assemblies past said fastener feed chute, an assembly feed chute for feeding assemblies away from said fastener feed chute, and means intersecting the path of assemblies fed by said fastener feed means for directing assemblies from said fastener feed chute into said assembly feeding chute.

27. Apparatus for assembling nut elements and washers comprising rotary feed means rotatable about an axis inclined from the vertical and having a plurality of outwardly opening edge recesses adapted to receive washers from a random mass on top of said rotary feed means for feeding washers along an arcuate path, rotary feed means rotatable about an axis parallel to the axis of the washer feed means and spaced radially therefrom, said last named feed means overlapping the washer feed means and having a plurality of outwardly opening edge recesses adapted to receive nut elements for feeding said nut elements along an arcuate path overlapping the path of said washers, means for operating the washer feed means and the nut element feed means in timed relation to bring nut elements and washers into alignment, means for relatively telescoping the aligned nut elements and washers, means receiving the assemblies so produced for selecting those of the assemblies so produced that are perfect, means adjacent the selecting means for feeding the perfect assemblies away from said selecting means, means for shifting the perfect assemblies laterally away from the last mentioned feeding means, and means for receiving assemblies so shifted and swaging a portion of each nut element outwardly beneath the washer assembled therewith to produce permanent assemblies.

28. Apparatus for assembling fasteners and washers comprising means for relatively telescoping flanged nut elements and washers, means for feeding the assemblies so produced away from said telescoping means, means independent of said feeding means for receiving assemblies for accurately positioning the assemblies relative to swaging means, swaging means spaced laterally of said feeding means for swaging the nut element flanges outwardly beneath the washer of said assemblies, transfer means for transferring assemblies laterally from said feeding means to said positioning means, means for shifting said positioning means to move the permanent assemblies away from said swaging means, and means for operating all of said foregoing means in proper timed relation.

29. Means for staking telescopically assembled flanged nut elements and washers comprising a plate adapted to receive telescopically assembled flanged nut elements and washers, means for sliding telescoped nut elements and washers from a receiving station on said plate to a staking station, means for accurately positioning telescoped nut elements and washers so slid at the staking station, a spring biased back-up member spaced above said plate, said plate being apertured at the assembly station, a staking pin having a frusto-conical tip and reciprocable through the aperture in said plate to engage the flange of each nut element to force the nut element against said back-up member to swage each nut element flange outwardly beneath the washer telescoped therewith, means for shifting said positioning member to eject the permanent assembly so produced, and means for operating said sliding means, said staking pin, and said positioning means in proper timed relation.

30. Apparatus for assembling fasteners and washers comprising rotary feed means having a plurality of outwardly opening edge recesses adapted to receive washers for feeding washers along an arcuate path, rotary feed means axially spaced above said washer feed means and rotatable about an axis parallel to the axis of the washer feed means and spaced radially therefrom, said last named feed means overlapping the washer feed means and having a plurality of outwardly opening edge recesses adapted to receive fasteners for feeding said fasteners along an arcuate path overlapping the path of said washers, means for supporting fasteners in the recesses of the fastener feed means, and means for operating the washer feed means and the fastener feed means in timed relation to bring fasteners and washers into alignment, said fastener supporting means being interrupted to allow the fasteners to drop into telescopic engagement with the aligned washers.

31. Apparatus for assembling fasteners and washers comprising a rotary disc having a plurality of means for receiving washers to be carried by said disc, a rotary disc having a plurality of axially opening apertures for receiving fasteners to be carried thereby, the axes of said discs being radially spaced apart and the fastener carrying disc being positioned axially above the washer carrying disc, means providing a surface underlying part of said fastener carrying disc for supporting fasteners in the axially opening apertures thereof, said discs overlapping one another and said surface providing means being terminated at the overlap for dropping fasteners from the recesses of said fastener carrying disc, and means for rotating said discs in timed relation so that fasteners dropped from said fastener carrying disc will be received on washers carried by the washer carrying disc.

32. Apparatus for feeding fastener and washer assemblies and loose fasteners and washers comprising a rotary carrier having a plurality of fastener receiving recesses for feeding fasteners and washers assembled therewith and also loose fasteners and washers, means adjacent to and cooperable with said carrier for feeding free washers away from said carrier, gravity chute means adjacent to and cooperable with said carrier for feeding free fasteners away from said carrier independently of said free washers, means preventing entrance of washers and assemblies into said gravity chute means, track means adjacent to and cooperable with said carrier for feeding assemblies away from said carrier and having means cooperable with the fasteners of assemblies for guiding the assemblies, and means receiving asemblies from said assembly feeding means for deforming a portion of each assembly to maintain said fasteners and washers in permanently assembled relation.

33. Apparatus for feeding fastener and washer assemblies and loose fasteners and washers comprising a rotary carrier having a plurality of edge opening recesses adapted to feed fasteners and washers assembled therewith and also loose fasteners and washers, means adjacent said carrier for feeding free washers away from said carrier, a fastener feed chute having a receiving end adjacent said carrier for feeding free fasteners away from said carrier, a member pivotally mounted at the receiving end of said feed chute and adapted to engage the washer of each assembly to guide said assemblies past said fastener feed chute, spring means normally biasing said pivotally mounted member out of the way of free fasteners, an assembly feed chute having a receiving end adjacent said carrier for feeding assemblies away from said carrier, and means for deforming a portion of each such assembly to maintain the assembled fasteners and washers permanently together.

34. Apparatus for feeding fastener and washer assemblies and loose fasteners and washers comprising a rotary carrier having a plurality of outwardly opening edge recesses for feeding fasteners and washers assembled therewith, means adjacent said carrier for feeding free washers away from said carrier, a fastener feeding chute having a receiving end adjacent said carrier for feeding free fasteners away from said carrier, gate means at the receiving end of said fastener feeding chute and closable by washers carried by said carriers for preventing entrance of assemblies into said fastener feeding chute, an assembly feeding chute having a receiving end adjacent said carrier for feeding fastener and washer assemblies away from said carrier, and means receiving the assemblies from said feeding means for deforming a portion of each assembly to retain the assembled fasteners and washers permanently together.

35. Apparatus for feeding fastener and washer assemblies and loose fasteners and washers comprising inclined means for feeding fasteners and washers assembled therewith and also loose fasteners and washers, inclined gravity means adjacent to and cooperable with said first mentioned feeding means for feeding free washers away from said carrier, inclined gravity means adjacent to and cooperable with said first mentioned feeding means for feeding free fasteners away from said first mentioned feeding means, inclined gravity means for feeding assemblies away from said first mentioned feeding means, and means receiving assemblies from said last mentioned feeding means for deforming a portion of each assembly permanently to secure the assembled fasteners and washers together.

36. Apparatus for feeding fastener and washer assemblies and loose fasteners and washers comprising a carrier having a plurality of edge opening recesses adapted to feed fasteners and washers assembled therewith and also loose fasteners and washers, means adjacent said carrier for feeding free washers away from said carrier, a fastener feed chute having a receiving end adjacent said carrier for feeding free fasteners away from said carrier, a member movably mounted at the receiving end of said feed chute and adapted to engage the washer of each assembly to guide said assemblies past said fastener feed chute, said movably mounted member normally being resiliently biased out of the way of free fasteners, and an assembly feed chute having a receiving end adjacent said carrier for feeding assemblies away from said carrier.

References Cited in the file of this patent

UNITED STATES PATENTS

| 1,272,634 | De Escobales | July 16, 1918 |
| 1,486,664 | Hires | Mar. 11, 1924 |
| 1,866,878 | Coates | July 12, 1932 |
| 1,946,820 | Stoll | Feb. 13, 1934 |
| 2,183,600 | Werner | Dec. 19, 1939 |
| 2,271,028 | Olson | Jan. 27, 1942 |
| 2,271,154 | Niskanen | Jan. 27, 1942 |
| 2,284,698 | Trotter | June 2, 1942 |
| 2,286,066 | Davis | June 9, 1942 |
| 2,494,939 | Nance | Jan. 17, 1950 |
| 2,519,434 | Buccicone | Aug. 22, 1950 |
| 2,577,020 | Large | Dec. 4, 1951 |
| 2,588,372 | Erb | Mar. 11, 1952 |
| 2,643,766 | Nordquist | June 30, 1953 |
| 2,711,550 | Nielsen | June 28, 1955 |